United States Patent
Takahama

(10) Patent No.: US 10,831,428 B2
(45) Date of Patent: Nov. 10, 2020

(54) MULTIPLE FUNCTION APPARATUS, DISPLAY SWITCHING METHOD AND NON-TRANSITORY COMPUTER-READABLE RECORDING MEDIUM ENCODED WITH DISPLAY SWITCHING PROGRAM

(71) Applicant: KONICA MINOLTA, INC., Tokyo (JP)

(72) Inventor: Hidekazu Takahama, Nagoya (JP)

(73) Assignee: KONICA MINOLTA, INC., Tokyo (JP)

( * ) Notice: Subject to any disclaimer, the term of this patent is extended or adjusted under 35 U.S.C. 154(b) by 25 days.

(21) Appl. No.: 15/790,551

(22) Filed: Oct. 23, 2017

(65) Prior Publication Data

US 2018/0136890 A1 May 17, 2018

(30) Foreign Application Priority Data

Nov. 16, 2016 (JP) .................. 2016-223420

(51) Int. Cl.
*G06F 3/14* (2006.01)
*H04N 1/00* (2006.01)
*G06F 3/147* (2006.01)

(52) U.S. Cl.
CPC ............ *G06F 3/1415* (2013.01); *G06F 3/147* (2013.01); *H04N 1/00129* (2013.01);
(Continued)

(58) Field of Classification Search
CPC ... G06F 3/1415; G06F 3/147; H04N 1/00129; H04N 1/00233; G09G 2340/12; G09G 2354/00
See application file for complete search history.

(56) References Cited

U.S. PATENT DOCUMENTS 9,632,767 B2 * 4/2017 Ko ........................... G06F 8/70
9,648,179 B2   5/2017 Ishino et al.
(Continued)

FOREIGN PATENT DOCUMENTS

CN    103873725 A    6/2014
JP    2001230899 A   8/2001
(Continued)

OTHER PUBLICATIONS

Chinese Office Action (and English language translation thereof) dated Mar. 18, 2019 issued in counterpart Chinese Application No. 201711120933.4.

(Continued)

*Primary Examiner* — Amare Mengistu
*Assistant Examiner* — Crystal Mathews
(74) *Attorney, Agent, or Firm* — Holtz, Holtz & Volek PC

(57) ABSTRACT

A multiple function apparatus includes a first hardware processor, a second hardware processor, and a display commonly used by the first hardware processor and the second hardware processor, wherein the first hardware processor determines a first screen, the second hardware processor determines a second screen, switches a display mode to any one of a single mode and a proxy mode, and in the case where the display mode is the proxy mode, allows the display to display an image of the first screen, and in the case where the display mode is the single mode, allows the display to display an image of the second screen.

18 Claims, 15 Drawing Sheets

(52) U.S. Cl.
CPC ..... *H04N 1/00233* (2013.01); *H04N 1/00501* (2013.01); *G09G 2340/12* (2013.01); *G09G 2354/00* (2013.01)

(56) References Cited

U.S. PATENT DOCUMENTS

| | | | | |
|---|---|---|---|---|
| 2004/0190035 A1* | 9/2004 | Ozawa | ............... | H04N 1/0035 358/1.13 |
| 2005/0114696 A1* | 5/2005 | Hashimoto | ............. | G06F 21/31 726/26 |
| 2005/0270586 A1* | 12/2005 | Hashimoto | ........ | H04N 1/00204 358/400 |
| 2006/0164675 A1* | 7/2006 | Yamada | ............. | H04N 1/00408 358/1.15 |
| 2006/0238786 A1* | 10/2006 | Sakura | ................ | G06F 3/1205 358/1.9 |
| 2008/0289031 A1* | 11/2008 | Anno | ...................... | G06F 21/41 726/17 |
| 2008/0307319 A1* | 12/2008 | Iwata | .................... | G06K 15/00 715/748 |
| 2009/0128844 A1* | 5/2009 | Kondo | ............... | H04N 1/00244 358/1.15 |
| 2009/0195819 A1* | 8/2009 | Sugimoto | .......... | H04N 1/00413 358/1.15 |
| 2009/0231637 A1* | 9/2009 | Kemmochi | ........ | H04N 1/00206 358/474 |
| 2010/0053674 A1* | 3/2010 | Kano | ................ | H04N 1/00204 358/1.15 |
| 2010/0309094 A1* | 12/2010 | Castleman | ............ | G06F 3/1462 345/2.1 |
| 2010/0309195 A1* | 12/2010 | Castleman | ............ | G06F 3/0481 345/418 |
| 2011/0007356 A1* | 1/2011 | Matsuura | ........... | H04N 1/00222 358/1.15 |
| 2011/0161823 A1* | 6/2011 | Miyata | ............... | H04N 1/00204 715/733 |
| 2012/0092715 A1* | 4/2012 | Kamei | ................ | G06F 3/04886 358/1.15 |
| 2012/0327443 A1* | 12/2012 | Fujii | .................. | H04N 1/00222 358/1.13 |
| 2013/0298032 A1* | 11/2013 | Sugaya | ................... | H04L 69/24 715/736 |
| 2013/0346963 A1* | 12/2013 | Hwang | ..................... | G06F 8/61 717/176 |
| 2014/0168698 A1* | 6/2014 | Okada | ................... | G06F 3/1236 358/1.15 |
| 2014/0229818 A1* | 8/2014 | Goswami | ............ | G06F 17/2247 715/234 |
| 2014/0368857 A1* | 12/2014 | Edamatsu | .......... | G06K 15/1806 358/1.13 |
| 2015/0067484 A1* | 3/2015 | Sumio | ................ | G06F 3/04883 715/251 |
| 2015/0172486 A1* | 6/2015 | Motosugi | ........... | H04N 1/00411 358/1.15 |
| 2015/0186935 A1 | 7/2015 | Hirokawa | | |
| 2015/0228048 A1* | 8/2015 | Heo | ...................... | G06F 1/3293 345/502 |
| 2016/0210086 A1* | 7/2016 | Kawano | ............... | H04N 1/0057 |
| 2016/0379597 A1* | 12/2016 | Miki | ...................... | G09G 5/12 345/2.2 |
| 2017/0034145 A1* | 2/2017 | Shimazaki | ............. | H04L 63/08 |
| 2017/0153780 A1* | 6/2017 | Asai | ...................... | G06F 3/0484 |
| 2017/0192727 A1* | 7/2017 | Yun | ....................... | G06F 3/1211 |
| 2017/0221451 A1* | 8/2017 | Connell | ................ | G06F 1/3206 |
| 2018/0107341 A1* | 4/2018 | Aurongzeb | ............ | G06F 3/167 |
| 2018/0136890 A1* | 5/2018 | Takahama | .......... | H04N 1/00501 |
| 2018/0373078 A1* | 12/2018 | Mizuno | ................... | G02F 1/133 |

FOREIGN PATENT DOCUMENTS

| | | |
|---|---|---|
| JP | 2014241494 A | 12/2014 |
| JP | 2016144157 A | 8/2016 |

OTHER PUBLICATIONS

Japanese Office Action (and English language translation thereof) dated Jun. 30, 2020 issued in Japanese Application No. 2016-223420.

* cited by examiner

F I G. 1 2
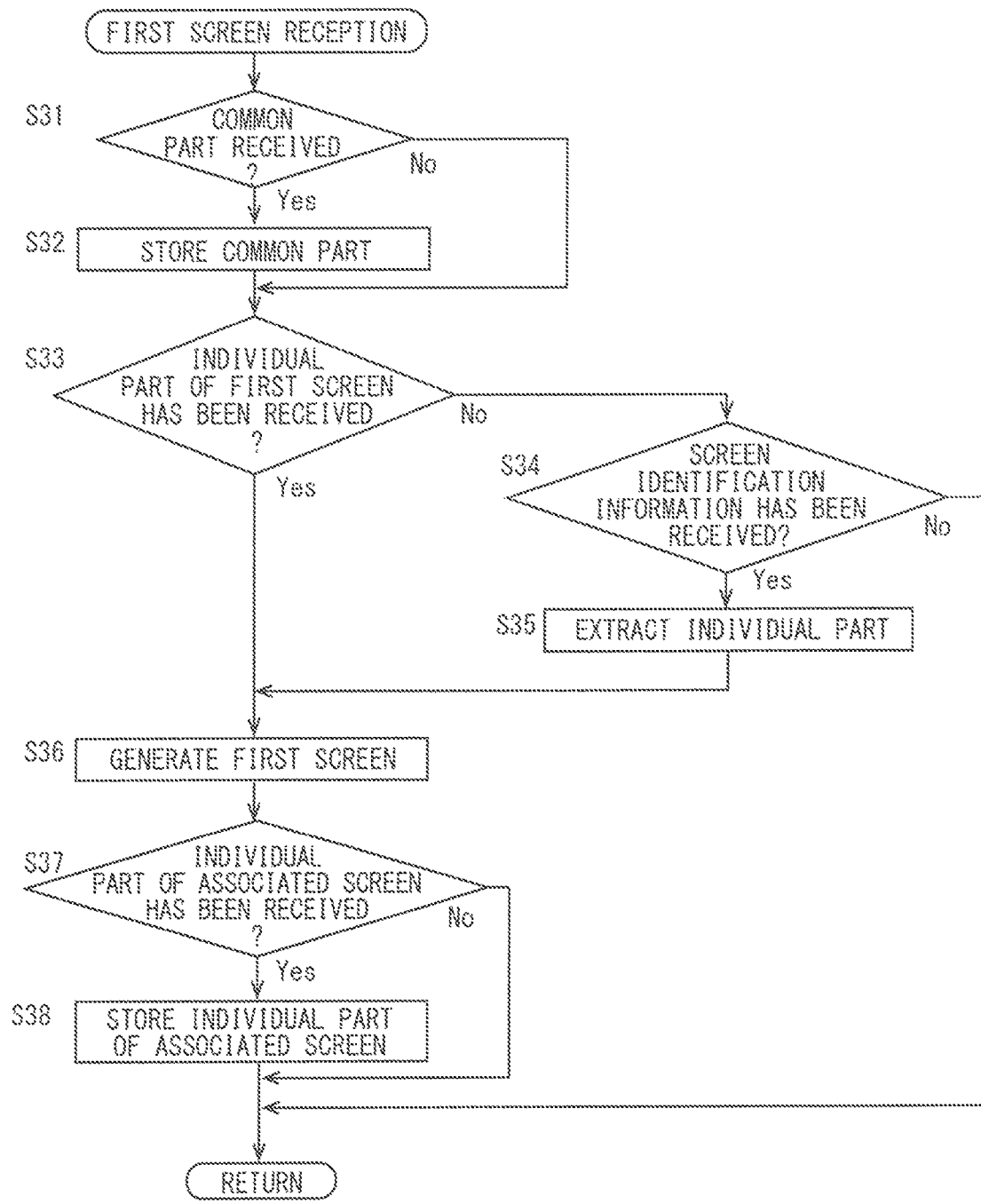

MULTIPLE FUNCTION APPARATUS, DISPLAY SWITCHING METHOD AND NON-TRANSITORY COMPUTER-READABLE RECORDING MEDIUM ENCODED WITH DISPLAY SWITCHING PROGRAM

Japanese Patent Application No. 2016-223420 filed on Nov. 16, 2016, including description, claims, drawings, and abstract, the entire disclosure is incorporated herein by reference in its entirety.

BACKGROUND

Technological Field

The present invention relates to a multiple function apparatus, a display switching method and a non-transitory computer-readable recording medium encoded with a display switching program. More specifically, the present invention relates to a multiple function apparatus in which a display device is commonly used by two central processing units, a display switching method performed by the multiple function apparatus, and a non-transitory computer-readable recording medium encoded with a display switching program.

Description of the Related Art

In recent years, an image forming apparatus represented by a multiple function peripheral (MFP) is sometimes used while being connected to a Local Area Network. An image forming apparatus including a server function has been realized. This type of MFP only has one operation panel used as a user interface, so that it is necessary that a screen is switched between a screen corresponding to functions of the image forming apparatus and a screen corresponding to the server function. Japan Open-laid Patent No. 2014-241494 describes a technology for switching two screens generated by two different applications.

Japan Open-laid Patent No. 2014-241494 describes an information processing system provided with a first application that corresponds in advance to an error screen for making notification of an error and a second application that does not correspond to the error screen, wherein the information processing system includes a display that displays a screen of an application, which is a subject to be displayed, a problem detector that detects an error that has occurred in the information processing system, a drawer that, in the case where the error is detected, draws an error screen for making notification of the detected error for the first application screen, and a controller that, in the case where the error is detected during an operation of the second application, switches the application, which is a subject to be displayed, from the second application to the first application, and controls the display of the error screen.

On the other hand, in the case where a Central Processing Unit (CPU) that handles an image forming function and a CPU that handles the server function are provided in the MFP, and the two CPUs commonly use an operation panel used as a user interface, it is necessary that a switch is provided between the operation panel and each of the two CPUs. Thus, an image generated in one CPU selected by the switch between the two CPUs can be displayed in the operation panel.

However, when the screens are switched by the switch, an image is sometimes temporarily not displayed, or electrical noise occurs. There is a problem that the screens cannot be smoothly switched.

SUMMARY

According to one aspect of the present invention, a multiple function apparatus includes a first hardware processor, a second hardware processor, and a display commonly used by the first hardware processor and the second hardware processor, wherein the first hardware processor determines a first screen, and the second hardware processor determines a second screen, switches a display mode to any one of a single mode and a proxy mode, in the case where the display mode is the proxy mode, allows the display to display an image of the determined first screen, and in the case where the display mode is the single mode, allows the display to display an image of the determined second screen.

According to another aspect of the present invention, a display switching method performed in a multiple function apparatus includes an image processing apparatus, an information processing apparatus and a display commonly used by the image processing apparatus and the information processing apparatus, wherein the display switching method allows the image processing apparatus to perform a first screen determining step of determining a first screen, and allows the information processing apparatus to perform a display control step of controlling the display and allowing the display to display an image, a second screen determining step of determining a second screen, a second operation determining step of determining a second operation corresponding to the determined second screen, and a mode switching step of switching a display mode to any one of a single mode and a proxy mode, and the display control step includes a step of, in the case where the display mode is the proxy mode, allowing the display to display an image of the first screen determined in the first screen determining step, and a step of, in the case where the display mode is the single mode, allowing the display to display an image of the second screen determined in the second screen determining step.

According to yet another aspect of the present invention, a non-transitory computer-readable recording medium is encoded with a display switching program, the display switching program being executed by a first hardware processor and a second hardware processor included in a multiple function apparatus, wherein the multiple function apparatus includes an image processing apparatus, an information processing apparatus and a display commonly used by the image processing apparatus and the information processing apparatus, the display switching program allows the first hardware processor controlling the image processing apparatus to perform a first screen determining step of determining a first screen, the display switching program further allows the second hardware processor controlling the information processing apparatus to perform a display control step of controlling the display and allowing the display to display an image, a second screen determining step of determining a second screen, a second operation determining step of determining a second operation corresponding to the determined second screen, and a mode switching step of switching a display mode to any one of a single mode and a proxy mode, and the display control step includes a step of, in the case where the display mode is the proxy mode, allowing the display to display an image of the first screen determined in the first screen determining step, and a step of, in the case where the display mode is the single mode, allowing the display to display an image of the second screen determined in the second screen determining step.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

FIG. 12 is a flow chart showing one example of a flow of a first screen receiving process;

DESCRIPTION OF THE PREFERRED EMBODIMENTS

Figure 1:
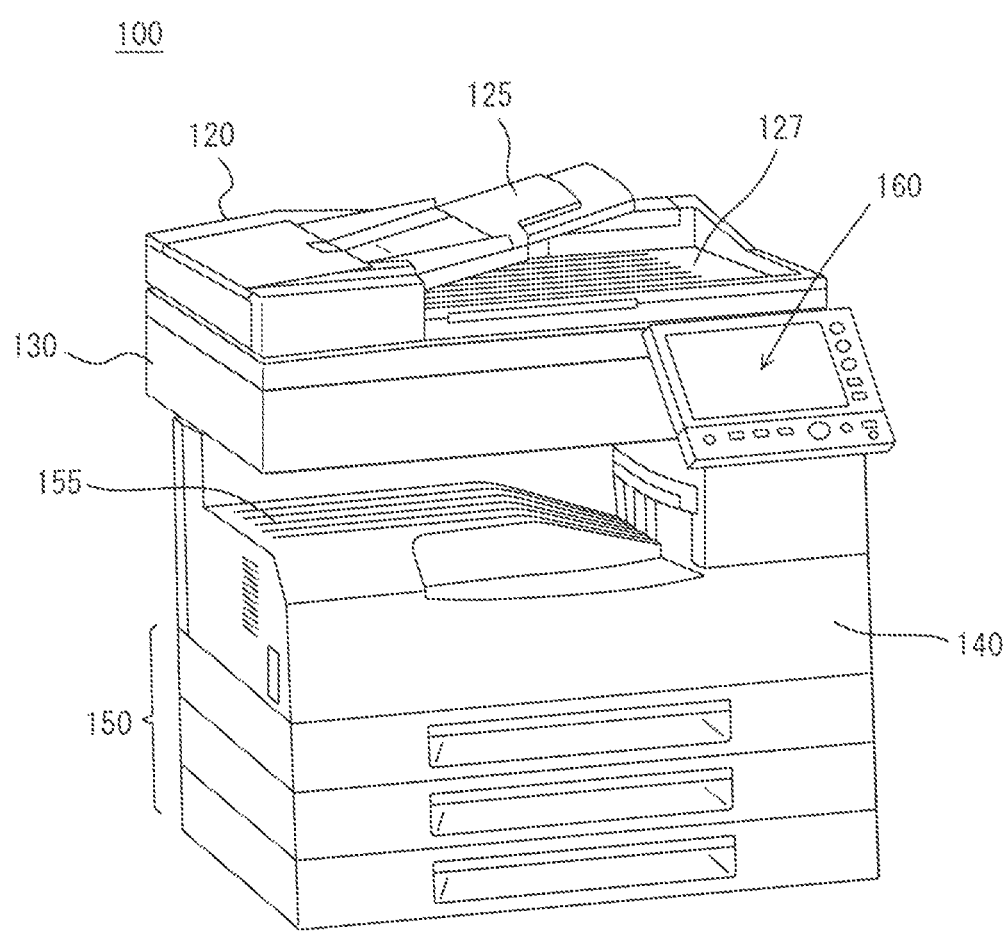
FIG. 1 is a perspective view showing the appearance of an MFP in one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

FIG. 1 is a perspective view showing the appearance of an MFP in one of the embodiments of the present invention. Referring to FIG. 1, the MFP (Multiple Function Peripheral) 100 is one example of an image forming apparatus, and includes a document scanning unit 130 for scanning a document, an automatic document feeder 120 for conveying a document to the document scanning unit 130, an image forming unit 140 for forming an image on a sheet of paper or other medium based on image data, a paper feed unit 150 for supplying sheets of paper to the image forming unit 140, and an operation panel 160 serving as a user interface.

The automatic document feeder 120 automatically conveys a plurality of documents set on a document feed tray 125 to a predetermined document scanning position of the document scanning unit 130 one by one, and discharges the document of which an image is scanned by the document scanning unit 130 onto a document discharge tray 127.

The document scanning unit 130 has a rectangular scanning surface for scanning a document. The scanning surface is formed of a platen glass, for example. The automatic document feeder 120 is connected to the body of the MFP 100 to be rotatable about an axis parallel to one side of the scanning surface, and is openable and closeable. The document scanning unit 130 is arranged below the automatic document feeder 120, and the scanning surface of the document scanning unit 130 is exposed with the automatic document feeder 120 rotated and open. Thus, a user can place a document on the scanning surface of the automatic scanning unit 130.

The document scanning unit 130 includes a light source that irradiates the document with light, and an optoelectronic transducer that receives the light, and scans the image formed on the document placed on the scanning surface. In the case where the document is placed on a scanning region, the light emitted by the light source is reflected from the document, and the optoelectronic transducer forms an image using the reflected light. When receiving the light reflected from the document, the optoelectronic transducer generates image data that is formed when the received light is converted into an electrical signal.

The paper feed unit 150 conveys sheets of paper stored in a paper feed tray to the image forming unit 140. The image forming unit 140 forms an image by a well-known electrophotographic technique, forms an image on a sheet of paper conveyed by the paper feed unit 150 based on the image data, and discharges the sheet of paper having an image formed thereon to a paper discharge tray 155.

Figure 2:
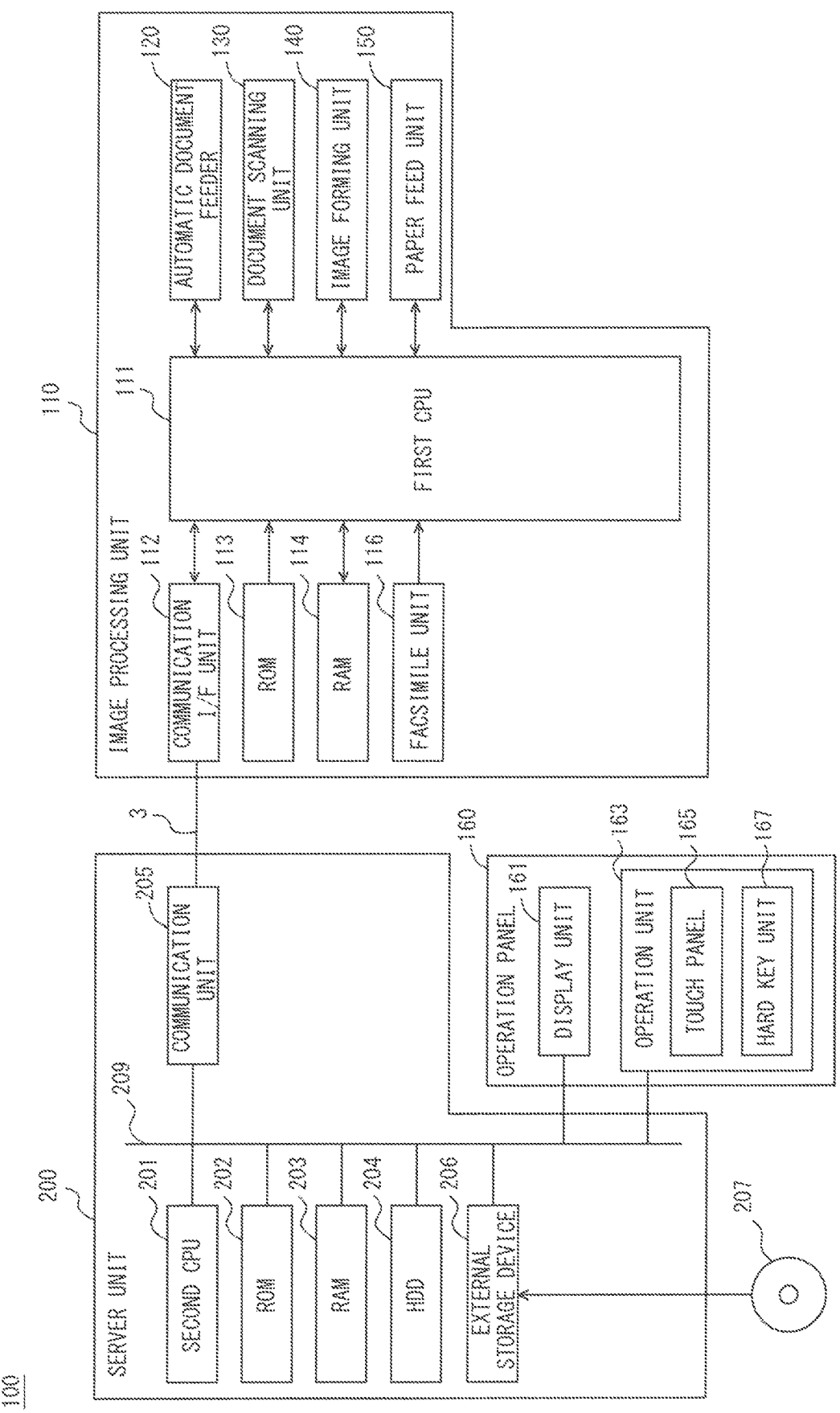
FIG. 2 is a block diagram showing one example of a hardware configuration of the MFP.

FIG. 2 is a block diagram showing one example of a hardware configuration of the MFP. Referring to FIG. 2, the MFP (Multiple Function Peripheral) 100 is one example of the image forming apparatus, and includes an image processing unit 110 that functions as an image processing apparatus, a server unit 200 that functions as a server, and an operation panel 160. he image processing unit 110 and the server unit 200 are connected to each other via a Local Area Network (LAN) 3. The image processing unit 110 includes a first CPU (Central Processing Unit) 111, a communication interface (I/F) unit 112, a ROM (Read Only Memory) 113, a RAM (Random Access Memory) 114, a facsimile unit 116, the automatic document feeder 120, the document scanning unit 130, the image forming unit 140 and the paper feed unit 150. The first CPU 111 is connected to the communication I/F unit 112, the ROM 113, the RAM 114, the facsimile unit 116, the automatic document feeder 120, the document scanning unit 130, the image forming unit 140 and the paper feed unit 150, and controls the entire image processing unit 110.

The ROM 113 stores a program executed by the first CPU 111 or data necessary for the execution of the program. The RAM 114 is used as a work area when the first CPU 111 executes a program. Further, the RAM 114 temporarily stores the image data successively transmitted from the document scanning unit 130.

The facsimile unit 116 is connected to the Public Switched Telephone Networks (PSTN) and transmits facsimile data to or receives facsimile data from the PSTN. The facsimile unit 116 converts the received facsimile data into print data that can be printed in the image forming unit 140, and outputs the print data to the image forming unit 140. The image forming unit 140 forms an image of the facsimile data received by the facsimile unit 116 on a sheet of paper. Further, the facsimile unit 116 converts the image data output by the document scanning unit 130 that has scanned the document into facsimile data, and transmits the facsimile data to a facsimile machine connected to the PSTN.

The communication I/F unit 112 is an interface for connecting the first CPU to the LAN 3. The communication I/F unit 112 communicates with the server unit 200 connected to the LAN 3 using a communication protocol such as a TCP (Transmission Control Protocol) or an FTP (File Transfer Protocol). The communication I/F unit 112 is connected to the LAN 3, either wired or wireless. Further, the LAN 3 may be connected to another computer other than the MFP 100. In this case, the communication I/F unit 112 can communicate with the other computer connected to the LAN 3. Further, in the case where the LAN 3 is connected to the Internet, the communication I/F unit 112 can communicate with another computer connected to the Internet.

The server unit 200 includes a second CPU 201 for controlling the entire server unit 200, a ROM 202 for storing a program executed by the second CPU 201, a RAM 203 used as a work area of the second CPU 201, a Hard Disc Drive (HDD) 204 for storing data in a non-volatile manner, a communication unit 205 that connects the second CPU 201 to the LAN 3 and an external storage device 206. The second CPU 201, the ROM 202, the RAM 203, the HDD 204, the communication unit 205 and the external storage device 206 are connected to a bus 209.

The ROM 202 stores a program executed by the second CPU 201, or data necessary for execution of the program. The RAM 203 is used as a work area when the second CPU 201 executes a program.

The communication unit 205 is an interface for connecting the second CPU 201 to the LAN 3. The communication unit 205 communicates with the image processing unit 110 connected to the LAN 3 using a communication protocol such as a TCP or an FTP. Further, in the case where the LAN 3 is connected to another computer other than the MFP 100, the communication unit 205 can communicate with the other computer connected to the LAN 3. Further, in the case where the LAN 3 is connected to the Internet, the communication unit 205 can communicate with another computer connected to the Internet.

The HDD 204 is a mass storage device and controlled by the second CPU 201. The second CPU 201 can read out the data stored in the HDD 204, and can write data into the HDD 204.

The external storage device 206 is controlled by the second CPU 201, and is mounted with a CD-ROM (Compact Disk Read Only Memory) 207 or a semiconductor memory. The second CPU 201 can control the external storage device 206, and can read out the data stored in the CD-ROM 207 or the semiconductor memory or can write data into the CD-ROM 207 or the semiconductor memory.

It is set by the second CPU 201 that the HDD 204 and the external storage device 206 are commonly used, and that the image processing unit 110 can access the HDD 204 and the external storage device 206. Therefore, the first CPU 111 can read out the data stored in the HDD 204 or the CD-ROM 207 mounted on the external storage device 206, and can also write data into the HDD 204 or the CD-ROM 207.

While an example in which the first CPU 111 executes a program stored in the ROM 113 is described in the present embodiment, the first CPU 111 may read out a program for execution by the first CPU 111 from the HDD 204, the CD-ROM 207 mounted on the external storage device 206 or the like, and may load the read program into the RAM 114 for execution. Similarly, the second CPU 201 may read out a program for execution by the second CPU 201 from the HDD 204, the CD-ROM 207 mounted on the external storage device 206 or the like, and may load the read program into the RAM 203 for execution.

It is noted that a recording medium for storing a program for execution by the first CPU 111 or the second CPU 201 is not limited to the CD-ROM 207. It may be a flexible disc, a cassette tape, an optical disc (MO (Magnetic Optical Disc)/MD (Mini Disc)/DVD (Digital Versatile Disc)), an IC card, an optical card, and a semiconductor memory such as a mask ROM, an EPROM (Erasable Programmable ROM) and an EEPROM (Electrically EPROM).

Further, the first CPU 111 or the second CPU 201 may download a program from a computer connected to the LAN 3 or the Internet, and may store the program in the HDD 204. Alternatively, the computer connected to the LAN 3 or the Internet may write a program in the HDD 204. In this case, the first CPU 111 loads the program stored in the HDD 204 into the RAM 114 for execution, and the second CPU 201 loads the program stored in the HDD 204 into the RAM 203 for execution. The program referred to here includes not only a program directly executable by the first CPU 111 or the second CPU 201 but also a source program, a compressed program, an encrypted program or the like.

The operation panel 160 is provided on an upper surface of the MFP 100. The operation panel 160 includes a display unit 161 and an operation unit 163. The display unit 161 and the operation unit 163 are connected to the bus 209 and controlled by the second CPU 201.

The operation panel 160 includes the display unit 161 and the operation unit 163. For example, the display unit 161 is a Liquid Crystal Display (LCD) device, and displays instruction menus to users, information about the acquired image data and the like. If being a device that displays images, an organic EL (Electroluminescence) display, for example, can be used instead of the LCD.

The operation unit 163 includes a touch panel 165 and a hard key unit 167. The touch panel 165 is a capacitance type. Not only the capacitance type but also another type such as a resistive film type, a surface acoustic wave type, an infrared type and an electromagnetic induction type can be used for the touch panel 165.

The touch panel 165 is provided with its detection surface superimposed on an upper surface or a lower surface of the display unit 161. The size of the detection surface of the touch panel 165 and the size of the display surface of the display unit 161 are the same. Therefore, the coordinate system of the display surface and the coordinate system of the detection surface are the same. The touch panel 165 detects a position designated by the user on the display surface of the display unit 161 using the detection surface, and outputs the position information indicating coordinates of the detected position to the second CPU 201. Because the coordinate system of the display surface and the coordinate system of the detection surface are the same, the coordinates specified by the position information output by the touch panel 165 can be replaced with coordinates of the display surface of the display unit 161. The hard key unit 167 includes a plurality of hard keys. The hard keys are contact switches, for example.

Figure 3:
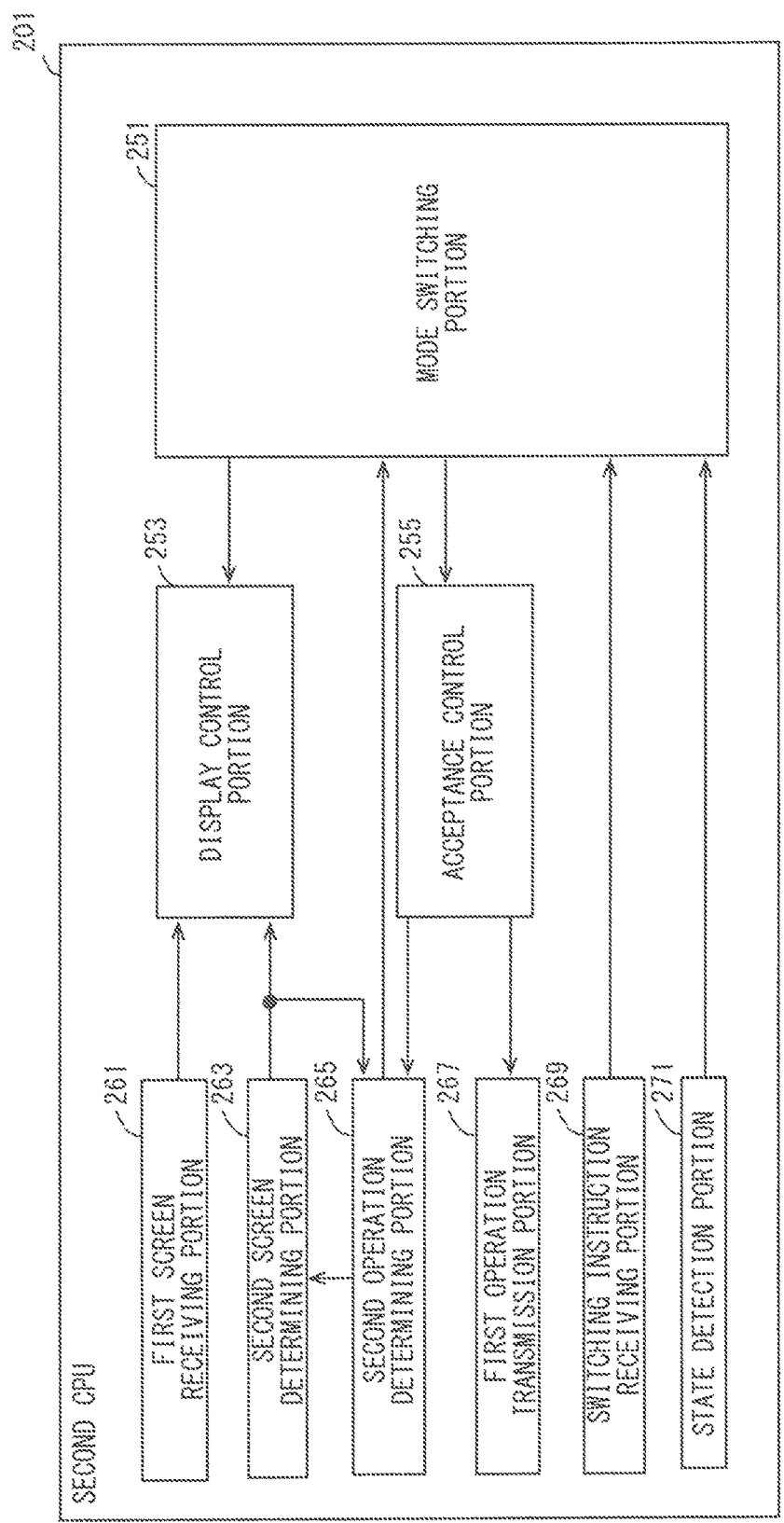
FIG. 3 is diagram showing one example of functions of a second CPU included in the MFP.

FIG. 3 is a diagram showing one example of functions of the second CPU included in the MFP. The functions shown in FIG. 3 are formed in the second CPU 201 in the case where the second CPU 201 included in the MFP 100 executes a program stored in the ROM 202, the HDD 204 or the CD-ROM 207. Referring to FIG. 3, the second CPU 201 includes a mode switching portion 251 for switching display modes, a display control portion 253, an acceptance control portion 255, a first screen receiving portion 261, a second screen determining portion 263, a second operation determining portion 265, a first operation transmission portion 267, a switching instruction receiving portion 269 and a state detection portion 271.

The mode switching portion 251 switches a display mode to any one of a single mode and a proxy mode. The mode switching portion 251 outputs the display mode to the display control portion 253 and the acceptance control portion 255.

The second screen determining portion 263 determines that a screen, which is generated in the case where the second CPU 201 executes a program, is a second screen. The second screen determining portion 263 outputs the second screen to the display control portion 253 and the second operation determining portion 265.

The first screen receiving portion 261 controls the communication unit 205 and receives a first screen transmitted by the image processing unit 110. The first screen receiving portion 261 outputs the first screen received from the image processing unit 110 to the display control portion 253.

The display control portion 253 controls the display unit 161, and allows the display unit 161 to display any one of the first screen and the second screen. The display control portion 253 receives a display mode from the mode switching portion 251. In the case where the display mode is the single mode, the display control portion 253 allows the display unit 161 to display the second screen. In the case where the display mode is the proxy mode, the display control portion 253 allows the display unit 161 to display the first screen. Specifically, the display unit 161 displays an image stored in a video RAM. Thus, in the case where the display mode is the proxy mode, the display control portion 253 stores the first screen in the video RAM. In the case where the display mode is the single mode, the display control portion 253 stores the second screen in the video RAM. Thus, in the case where the first screen is stored in the video RAM, the display unit 161 displays the first screen. In the case where the second screen is stored in the video RAM, the display unit 161 displays the second screen.

The acceptance control portion 255 controls the operation unit 163 and accepts an operation input by the user. The acceptance control portion 255 receives the display mode from the mode switching portion 251. The acceptance control portion 255 outputs an operation, detected when the display mode is the single mode, to the second operation determining portion 265. Further, the acceptance control portion 255 outputs an operation, detected when the display mode is the proxy mode, to the first operation transmission portion 267. The acceptance control portion 255 controls the touch panel 165 and the hard key unit 167. When detecting a position with which a finger of the user has come into contact in the detection surface, the touch panel 165 outputs position information indicating a position in the detection surface. In the case where the acceptance control portion 255 acquires the position information output by the touch panel 165, if the display mode is the single mode, the acceptance control portion 255 outputs the position information to the second operation determining portion 265. If the display mode is the proxy mode, the acceptance control portion 255 outputs the position information to the first operation transmission portion 267. The hard key unit 167 includes the plurality of hard keys. When any one of the plurality of hard keys is pressed by the user, the hard key unit 167 outputs key identification information of the pressed hard key. In the case where the acceptance control portion 255 acquires the key identification information output by the hard key unit 167, if the display mode is the single mode, the acceptance control portion 255 outputs the key identification information to the second operation determining portion 265. If the display mode is the proxy mode, the acceptance control portion 255 outputs the key identification information to the first operation transmission portion 267.

The second operation determining portion 265 receives the second screen from the second screen determining portion 263, and receives the position information or the key identification information from the acceptance control portion 255. In response to reception of the position information from the acceptance control portion 255, the second operation determining portion 265 determines an operation based on the position in the second screen specified by the position information. For example, in the case where the second screen includes a plurality of buttons to which a plurality of operations are respectively assigned, the second operation determining portion 265 determines an operation assigned to the button at the position specified by the position information among the plurality of buttons included in the second screen. Specifically, in the case where the second screen includes a screen switching button to which an operation of giving an instruction to switch the screen to another screen is assigned, if the position specified by the position information is within the screen switching button, the second operation determining portion 265 determines that the accepted operation is an operation of giving an instruction to switch the screen to the other screen. In this case, the second operation determining portion 265 outputs operation identification information for identifying an operation of giving an instruction to switch the screen to the other screen to the second screen determining portion 263. In response to reception of the operation identification information, the second screen determining portion 263 determines in accordance with an operation specified by the operation identification information that the other screen is the second screen.

In response to reception of the key identification information from the acceptance control portion 255, the second operation determining portion 265 determines an operation assigned to the key specified by the key identification information. For example, in the case where an operation of giving an instruction to switch the screen to a predetermined screen is assigned to the key specified by the key identification information, the second operation determining portion 265 determines that the accepted operation is an operation of giving an instruction to switch the screen to the predetermined screen. In this case, the second operation determining portion 265 outputs the operation identification information for identifying the operation of giving an instruction to switch the screen to the predetermined screen to the second screen determining portion 263. In response to reception of the operation identification information, the second screen determining portion 263 determines in accordance with the operation specified by the operation identification information that the predetermined screen is the second screen.

The second screen determining portion 263 combines a proxy mode switching button, to which an operation of giving an instruction to switch the display mode to the proxy mode is assigned, with a screen that is generated in the case where the second CPU 201 executes a program with the proxy mode switching button superimposed on the screen. The proxy mode switching button is an image, and preferably has a character string indicating that the operation of switching the display mode to the proxy mode is assigned to the button. Further, the proxy mode switching button may be a reduced-size image of the first screen received by the first screen receiving portion 261. The second screen determining portion 263 outputs the second screen, on which the proxy mode switching button is superimposed, to the display control portion 253 and the second operation determining portion 265.

In the case where the second screen includes the proxy mode switching button to which the operation of giving an instruction to switch the display mode to the proxy mode is assigned, when a position specified by the position information received from the acceptance control portion 255 is within the proxy mode switching button, the second operation determining portion 265 determines that the accepted operation is an operation of giving an instruction to switch the display mode to the proxy mode, and outputs a switching instruction to the mode switching portion 251.

In response to reception of the position information or the key identification information from the acceptance control portion 255, the first operation transmission portion 267 controls the communication unit 205 and transmits the position information or the key identification information to the image processing unit 110.

Further, the hard key unit 167 sometimes includes a proxy mode switching key to which an operation of giving an instruction to switch the display mode to the proxy mode is assigned. In the case where the hard key specified by the key identification information received from the acceptance control portion 255 is the proxy mode switching key, the second operation determining portion 265 determines that the accepted operation is an operation of giving an instruction to switch the display mode to the proxy mode, and outputs a switching instruction to the mode switching portion 251.

In response to reception of the position information or the key identification information from the acceptance control portion 255, the first operation transmission portion 267 controls the communication unit 205 and transmits the position information or the key identification information to the image processing unit 110. The acceptance control portion 255 outputs the position information or the key identification information to the first operation transmission portion 267 in the case where the display mode is switched to the proxy mode by the mode switching portion 251. Therefore, in response to reception of the position information or the key identification information from the acceptance control portion 255 when the display mode is the proxy mode, the first operation transmission portion 267 transmits the position information or the key identification information to the image processing unit 110.

As described below, the image processing unit 110 sometimes transmits the switching instruction. The switching instruction receiving portion 269 controls the communication unit 205 and receives a switching instruction transmitted by the image processing unit 110. In response to reception of the switching instruction from the image processing unit 110, the switching instruction receiving portion 269 outputs the switching instruction to the mode switching portion 251.

As described below, when being in a predetermined state, the image processing unit 110 sometimes transmits a state signal. The state detection portion 271 controls the communication unit 205 and receives the state signal transmitted by the image processing unit 110. In response to reception of the state signal from the image processing unit 110, the state detection portion 271 outputs a switching instruction to the mode switching portion 251.

In response to reception of the switching instruction from the second operation determining portion 265 when the display mode is being switched to the single mode, the mode switching portion 251 switches the display mode to the proxy mode. In response to reception of the switching instruction from the switching instruction receiving portion 269 when the display mode is being switched to the single mode, the mode switching portion 251 switches the display mode to the proxy mode. Further, in response to reception of the switching instruction from the state detection portion 271 when the display mode is being switched to the single mode, the mode switching portion 251 switches the display mode to the proxy mode. In these cases, because the display mode received from the mode switching portion 251 is switched from the single mode to the proxy mode, the display control portion 253 switches the screen from the second screen that has been displayed till then to the first screen received by the first screen receiving portion 261 from the image processing unit 110.

In response to reception of the switching instruction from the switching instruction receiving portion 269 when the display mode is being switched to the proxy mode, the mode switching portion 251 switches the display mode to the single mode. In this case, the display mode received from the mode switching portion 251 is switched from the proxy mode to the single mode, the display control portion 253 switches the screen from the first screen that has been displayed till then to the second screen determined by the second screen determining portion 263.

Figure 4:
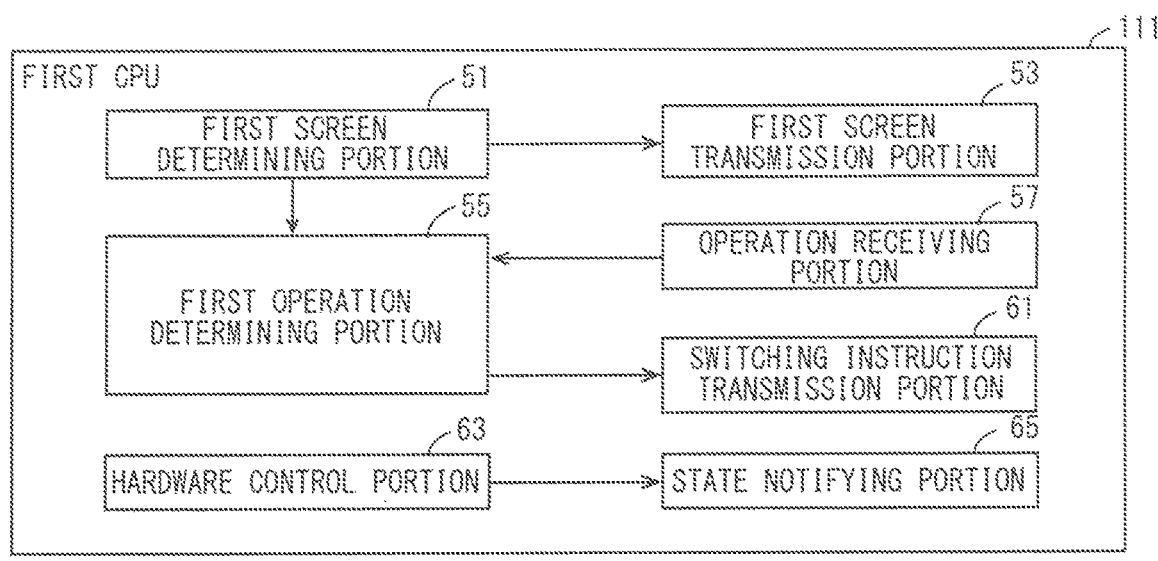
FIG. 4 is a diagram showing one example of functions of a first CPU included in the MFP.

FIG. 4 is a diagram showing one example of functions of the first CPU included in the MFP. The functions shown in FIG. 4 are functions formed in the first CPU 111 in the case where the first CPU 111 included in the MFP 100 executes a program stored in the ROM 113, the HDD 204 or the CD-ROM 207. Referring to FIG. 4, the first CPU 111 includes a first screen determining portion 51, a first screen transmission portion 53, a first operation determining portion 55, an operation receiving portion 57, a switching instruction transmission portion 61, a hardware control portion 63 and a state notifying portion 65.

The first CPU 111 executes a program and executes a process of controlling the hardware resources. The hardware resources include the communication I/F unit 112, the facsimile unit 116, the automatic document feeder 120, the document scanning unit 130, the image forming unit 140 and the paper feed unit 150. The first screen determining portion 51 selects one operation screen for the first screen from among the plurality of operation screens. The plurality of operation screens include a screen for selection of a process executed by the first CPU 111, a screen for setting of a setting value required for execution of the selected process by the first CPU 111 and a screen showing a state of the hardware resources. The first screen determining portion 51 combines a single mode switching button, to which an operation of giving an instruction to switch the display mode to the single mode is assigned, with the determined first screen with the single mode switching button superimposed on the first screen. The single mode switching button is an image, and preferably has a character string indicating that the image is for switching the display mode to the single mode. The first screen determining portion 51 outputs the first screen on which the single mode switching button is superimposed to the first screen transmission portion 53 and the first operation determining portion 55.

In response to reception of the first screen from the first screen determining portion 51, the first screen transmission portion 53 controls the communication I/F unit 112 and transmits the first screen to the server unit 200.

The operation receiving portion 57 controls the communication I/F unit 112, and receives the position information or the key identification information transmitted by the server unit 200. In response to reception of the position information or the key identification information, the operation receiving portion 57 outputs the position information or the key identification information to the first operation determining portion 55.

The first operation determining portion 55 receives the first screen from the first screen determining portion 51, and receives the position information or the key identification information from the operation receiving portion 57. In response to reception of the position information from the operation receiving portion 57, the first operation determining portion 55 determines the operation based on a position in the first screen specified by the position information. For example, in the case where the first screen includes a plurality of buttons to which a plurality of operations are respectively assigned, the first operation determining portion 55 determines the operation assigned to the button at the position specified by the position information among the plurality of buttons included in the first screen. Specifically, in the case where the first screen includes the screen switching button to which an operation of giving an instruction to switch the screen to another operation screen is assigned, if the position specified by the position information is within the screen switching button, the first operation determining portion 55 determines that the accepted operation is the operation of giving an instruction to switch the screen to another screen. In this case, the first operation determining portion 55 outputs the operation identification information for identifying an operation of giving an instruction to switch the screen to another operation screen to the first screen determining portion 51. In response to reception of the operation identification information, the first screen determining portion 51 determines in accordance with an operation specified by the operation identification information that the other operation screen is the first screen.

In response to reception of the key identification information from the operation receiving portion 57, the first operation determining portion 55 determines an operation assigned to the key specified by the key identification information. For example, in the case where an operation of giving an instruction to switch the screen to a predetermined operation screen is assigned to the key specified by the key identification information, the first operation determining portion 55 determines that the accepted operation is the operation of giving an instruction to switch the screen to the predetermined operation screen. In this case, the first operation determining portion 55 outputs the operation identification information for identifying an operation of giving an instruction to switch the screen to the predetermined operation screen to the first screen determining portion 51. In response to reception of the operation identification information, the first screen determining portion 51 determines in accordance with the operation specified by the operation identification information that the predetermined operation screen is the first screen.

The first screen sometimes includes the single mode switching button to which the operation of giving an instruction to switch the display mode to the single mode is assigned. In the case where a position specified by the position information received from the operation receiving portion 57 is within the single mode switching button, the first operation determining portion 55 determines that the accepted operation is the operation of giving an instruction to switch the display mode to the single mode, and outputs a transmission instruction to the switching instruction transmission portion 61.

In response to reception of the transmission instruction from the first operation determining portion 55, the switching instruction transmission portion 61 controls the communication I/F unit 112, and transmits the switching instruction to the server unit 200.

The hardware control portion 63 controls the hardware resources. In the case where detecting a change of a state of the hardware resources to a predetermined state, the hardware control portion 63 outputs a notification instruction to the state notifying portion 65, and outputs a state signal indicating the state to the first screen determining portion 51. Specifically, in the case where detecting a problem with the hardware resources, the hardware control portion 63 outputs a notification instruction to the state notifying portion 65. The problems with the hardware resources are a paper jam of a document in a transport path in the automatic document feeder 120, a paper jam of a sheet of paper in a transport path in the image forming unit 140 or the paper feed unit 150, a shortage of sheets of paper stored in the paper feed unit 150 during the image formation in the image forming unit 140, failed completion of transmission and reception of facsimile data by the facsimile unit 116, and failed completion of transmission and reception of data by the communication I/F, for example.

In the case where an event in which one or more consumables of the hardware resources reach predetermined operable life spans, the hardware control portion 63 outputs a notification instruction to the state notifying portion 65. As for the consumables of the hardware resources, consumables in the image forming unit 140, for example, include a tonner, a photoreceptor drum, a development roller and a fixing roller.

Further, in the case where detecting a predetermined operation with respect to the hardware resources by the user, the hardware control portion 63 outputs a notification instruction to the state notifying portion 65. The predetermined operation with respect to the hardware resources by the user includes an operation of placing a document in the automatic document feeder 120, an operation of opening the automatic document feeder 120, an operation of opening a front cover that covers the image forming unit 140 and an operation of opening a side cover that covers a path through which sheets of paper are conveyed, for example.

In response to reception of the notification instruction from the hardware control portion 63, the state notifying portion 65 controls the communication I/F unit 112, and transmits a state signal to the server unit 200.

When receiving a state signal from the hardware control portion 63, the first screen determining portion 51 determines that a screen corresponding to the state of the hardware resources specified by the state signal is the first screen. For example, in the case where the state signal indicates a problem with the hardware resources, the first screen determining portion 51 determines that a screen indicating the cause of the problem or a screen showing an operation procedure for resolving the problem is the first screen. Further, in the case where the state signal indicates an event in which one or more consumables of the hardware resources have reached predetermined operable life spans, the first screen determining portion 51 determines that a maintenance screen indicating a period of use and an operable life span of each of the one or more consumables is the first screen. Further, in the case where the state signal indicates an event in which the predetermined operation by the user is detected, if the predetermined operation is the operation of placing a document in the automatic document feeder 120 or the operation of opening the automatic document feeder 120, the first screen determining portion 51 determines that a copy screen for setting a setting value for the copy process is the first screen. If the state signal indicates the operation of opening the front cover that covers the image forming unit 140 or the operation of opening the side cover that covers the path through which a sheet of paper is conveyed, the first screen determining portion 51 determines that the maintenance screen is the first screen.

Figure 5:
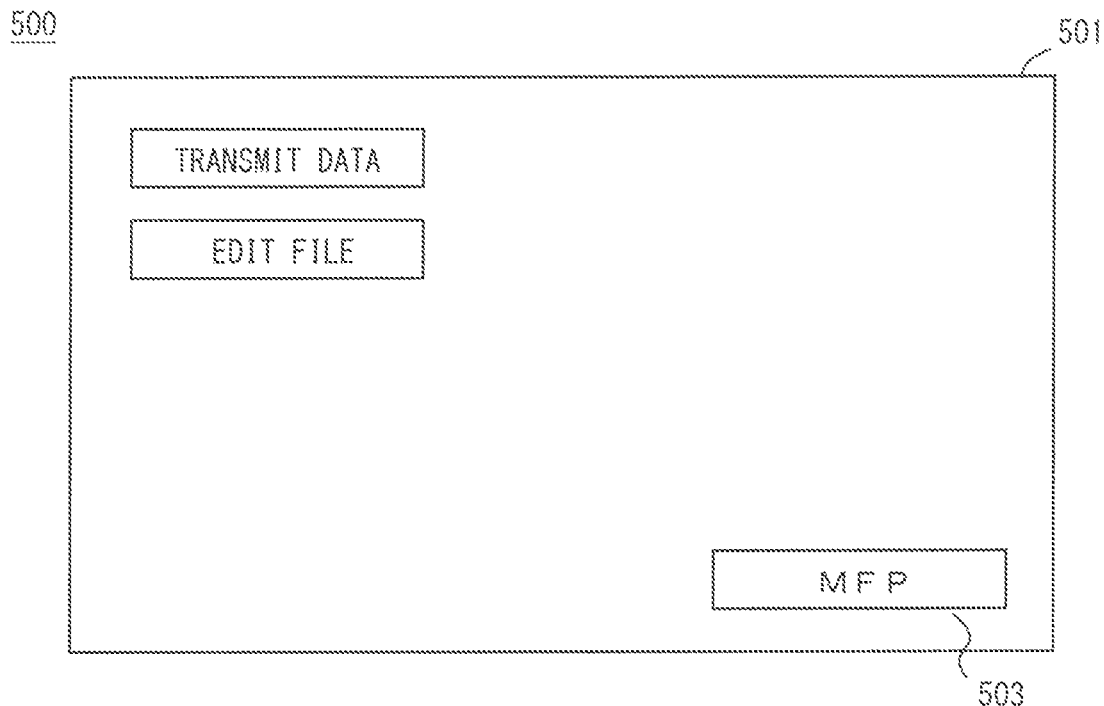
FIG. 5 is a first diagram showing one example of a second screen.

FIG. 5 is a first diagram showing one example of the second screen. Referring to FIG. 5, the second screen 500 includes a screen 501 generated in the case where the server unit 200 executes an application program, and the proxy mode switching button 503. The letters "MFP" are displayed in the proxy mode switching button 503.

Figure 6:
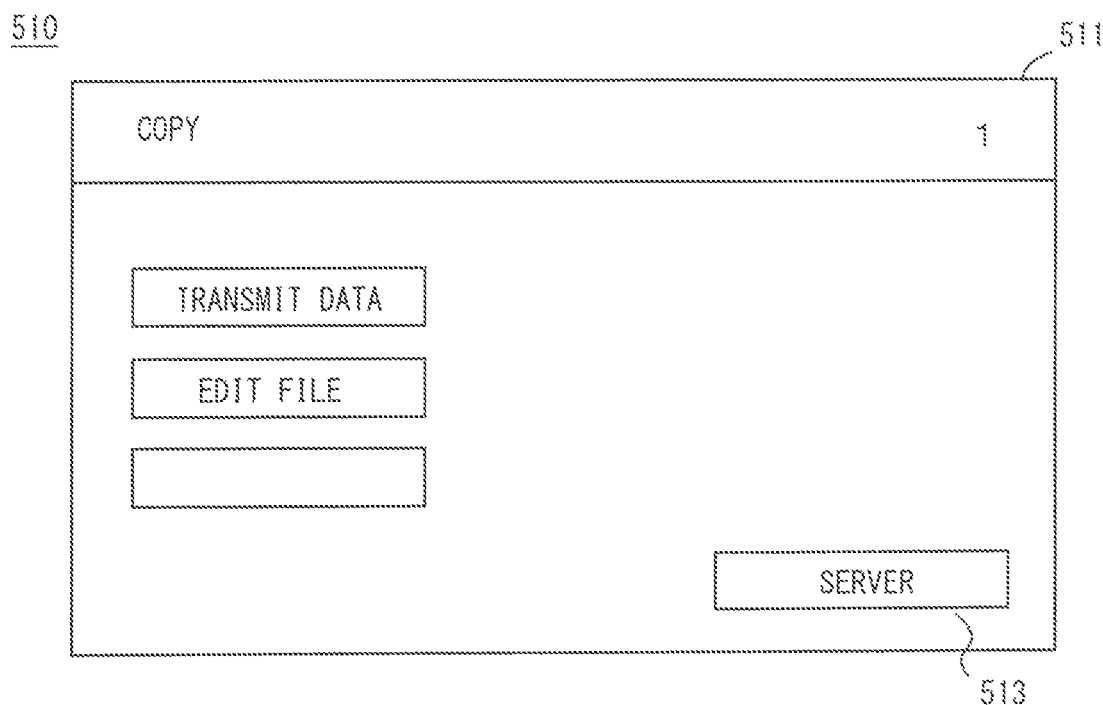
FIG. 6 is a first diagram showing one example of a first screen.

FIG. 6 is a first diagram showing one example of the first screen. Referring to FIG. 6, the first screen 510 includes one operation screen 511 selected from among the plurality of operation screens stored in the image processing unit 110 in advance, and the single mode switching button 513. The letters "SERVER" are displayed in the single mode switching button 513.

Figure 7:
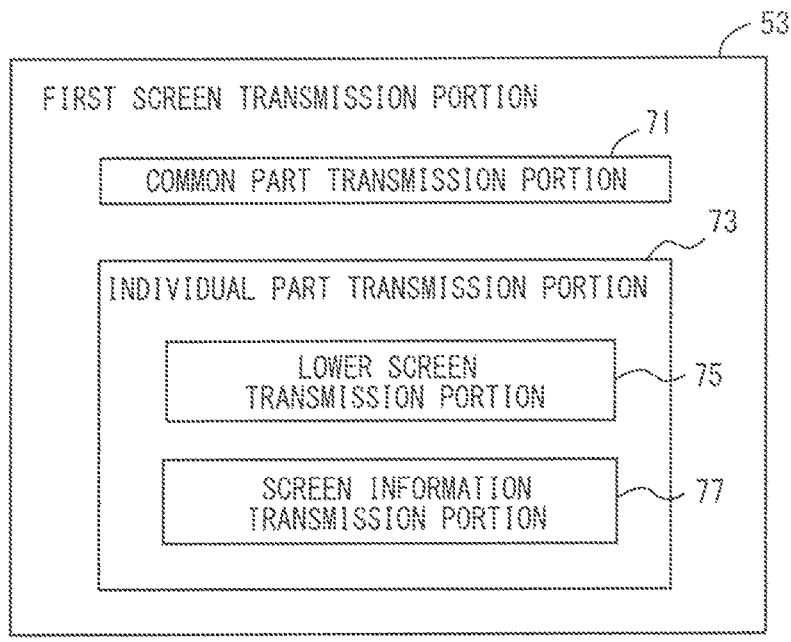
FIG. 7 is a diagram showing one example of detailed functions of a first screen transmission portion.

FIG. 7 is a diagram showing one example of the detailed functions of the first screen transmission portion. Referring to FIG. 7, the first screen transmission portion 53 includes a common part transmission portion 71 and an individual part transmission portion 73. The first screen determining portion 51 selects one operation screen for the first screen from among the plurality of operation screens. Each of the plurality of operation screens includes a common part that is common to the plurality of screens, and an individual part that is different from individual parts of other screens.

The common part transmission portion 71 controls the communication I/F unit 112, and transmits the common part that is common to the plurality of operation screens to the server unit 200. The common part may be transmitted earlier than the transmission of the individual parts. For example, it may be the time when the MFP 100 is powered on, or the time when the server unit 200 is powered on.

In response to reception of the first screen from the first screen determining portion 51, the individual part transmission portion 73 controls the communication I/F unit 112, and transmits the individual part of the first screen to the server unit 200.

The plurality of operation screens sometimes form a multilayer structure. In this case, each of the plurality of operation screens is assigned to any one of a plurality of layers. Further, each of the plurality of operation screens is sometimes associated with one or more of other operation screens assigned to upper layers, and also sometimes associated with one or more of other operation screens assigned to lower layers.

The individual part transmission portion 73 may include a lower screen transmission portion 75 and a screen information transmission portion 77. The lower screen transmission portion 75 specifies one or more operation screens, associated with the first screen in layers lower than the layer to which the first screen is assigned, as associated screens. In the case where specifying the one or more associated screens, the lower screen transmission portion 75 transmits an individual part of each of the one or more associated screens to the server unit 200 together with the individual part of the first screen, and outputs them to the screen information transmission portion 77. In the case where receiving the first screen from the first screen determining portion 51, and the individual part of the first screen is any one of individual parts of the one or more associated screens received from the lower screen transmission portion 75, the screen information transmission portion 77 outputs a transmission prevention instruction to the lower screen transmission portion 75, controls the communication I/F unit 112 and transmits the screen identification information for identifying the first screen to the server unit 200. Because the screen information transmission portion 77 transmits the screen identification information having a data amount smaller than that of the individual part, a transmission time period can be reduced.

Figure 8:
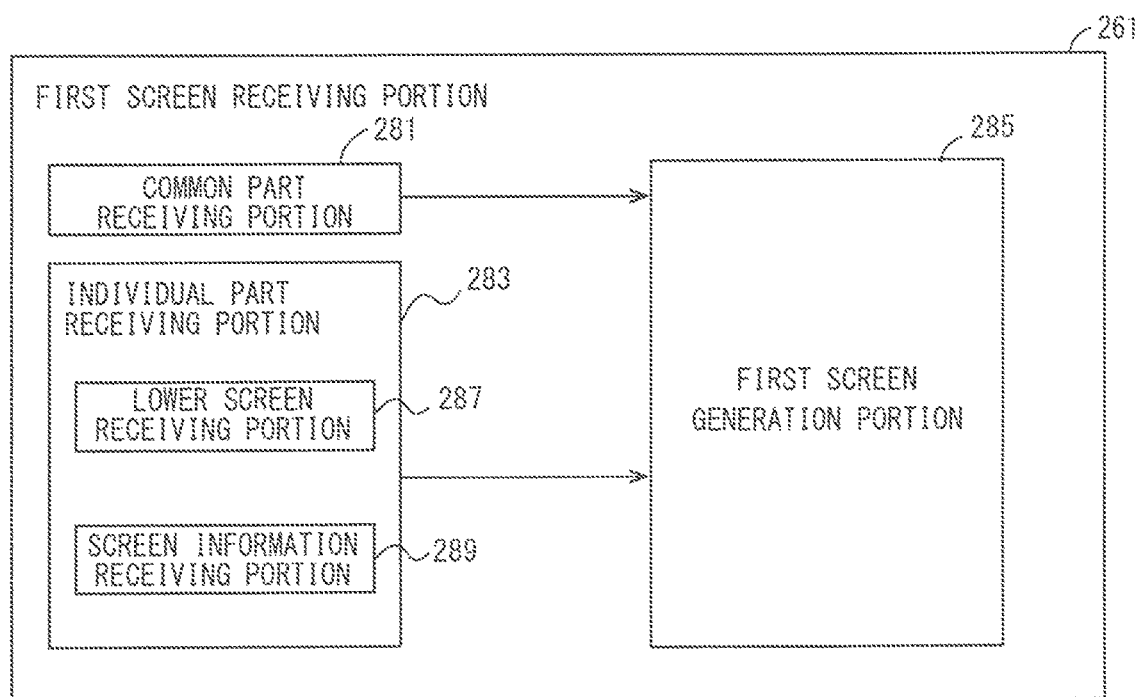
FIG. 8 is a diagram showing one example of detailed functions of a first screen receiving portion.

FIG. 8 is a diagram showing one example of the detailed functions of the first screen receiving portion.

Referring to FIG. 8, the first screen receiving portion 261 includes a common part receiving portion 281, an individual part receiving portion 283 and a first screen generation portion 285. The common part receiving portion 281 controls the communication unit 205 and receives a common part transmitted by the image processing unit 110. The common part receiving portion 281 outputs the received common part to the first screen generation portion 285.

The individual part receiving portion 283 controls the communication unit 205, and receives an individual part transmitted from the image processing unit 110. The common part receiving portion 281 outputs the received individual part to the first screen generation portion 285.

In response to reception of the individual part from the individual part receiving portion 283, the first screen generation portion 285 combines the common part received from the common part receiving portion 281 with the individual part received from the individual part receiving portion 283, and generates the first screen. The first screen generation portion 285 outputs the first screen to the display control portion 253.

The individual part receiving portion 283 may include a lower screen receiving portion 287 and a screen information receiving portion 289. In the case where the communication unit 205 receives individual parts of one or more associated screens together with an individual part from the image processing unit 110, the individual part receiving portion 283 temporarily stores individual parts of the one or more associated screens in the RAM 114.

In response to reception of the screen identification information by the communication unit 205 from the image processing unit 110, the screen information receiving portion 289 extracts an individual part of the associated screen specified by the screen identification information from among the individual parts of the one or more associated screens temporarily stored in the RAM 114. The screen information receiving portion 289 outputs an extracted individual part to the first screen generation portion 285.

Figure 9:
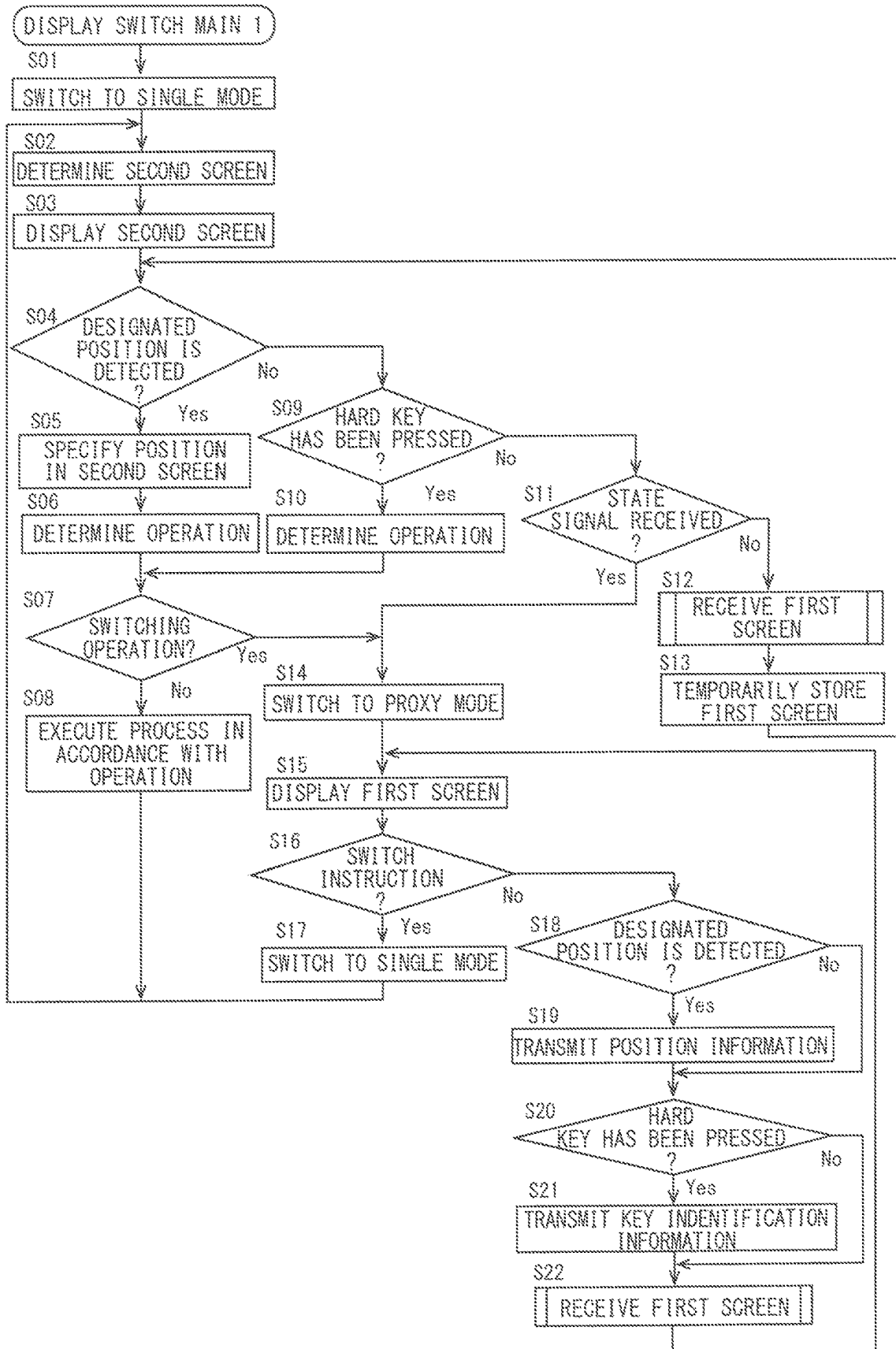
FIG. 9 is a flow chart showing one example of a flow of a display switching main process.

FIG. 9 is a flow chart showing one example of a flow of a display switching main process. The display switching main process is executed by the second CPU 201 in the case where the second CPU 201 included in the MFP 100 executes a display switching main program stored in the ROM 202, the HDD 204 or the CD-ROM 207. The display switching main program is part of a display switching program. Referring to FIG. 9, the second CPU 201 switches the display mode to the single mode (step S01). Then, the second CPU 201 determines the second screen (step S02). The second CPU 201 determines that a screen generated by a task of executing the application program which is currently under execution is the second screen. Then, the second CPU 201 controls the display unit 161 and displays the second screen (step S03). Specifically, the second CPU 201 stores the second screen in a video RAM to which the display unit 161 makes reference.

In the next step S04, the second CPU 201 determines whether a position in the display surface of the display unit 161 designated by the user has been detected. In the case where the touch panel 165 outputs the position information, the designated position is detected. If the designated position is detected, the process proceeds to the step S05. If not, the process proceeds to the step S09. In the step S05, a position designated by the user in the second screen is specified. The second CPU 201 specifies a position in the second screen specified by the position information output by the touch panel 165. In the next step S06, the operation is determined. The second CPU 201 determines an operation assigned to the button arranged at the position specified in the second screen, and the process proceeds to the step S07.

In the step S09, the second CPU 201 determines whether press of any of the plurality of hard keys included in the hard key unit 167 has been detected. If the press of a hard key has been detected, the process proceeds to the step S10. If not, the process proceeds to the step S11. In the step S10, the second CPU 201 determines an operation assigned to the pressed hard key, and the process proceeds to the step S07.

In the step S11, the second CPU 201 determines whether the communication unit 205 has received a state signal from the image processing unit 110. If the state signal has been received, the process proceeds to the step S14. If not, the process proceeds to the step S12. In the step S12, a first screen receiving process is executed, and the process proceeds to the step S13. While the details of the first screen receiving process will be described below, the first screen receiving process is a process of receiving the first screen in the case where the image processing unit 110 transmits the first screen. In the step S13, the first screen is temporarily stored in the RAM 203, and the process returns to the step S04.

In the step S07, the second CPU 201 determines whether the operation determined in the step S06 or the step S10 is a switching operation of switching the display mode to the proxy mode. If the determined operation is the switching operation, the process proceeds to the step S14. If not, the process proceeds to the step S08. In the step S08, the process is executed in accordance with the determined operation, and the process returns to the step S02.

In the step S14, the display mode is switched to the proxy mode, and the process proceeds to the step S15. In the step S15, the second CPU 201 controls the display unit 161, and displays the first screen temporarily stored in the RAM 203 in the step S13. Specifically, the first screen is stored in the video RAM to which the display unit 161 makes reference.

In the next step S16, it is determined whether the communication unit 205 has received a switching instruction from the image processing unit 205. If the switching instruction has been received, the process proceeds to the step S17. If not, the process proceeds to the step S18. In the step S17, the display mode is switched to the single mode, and the process returns to the step S02.

In the step S18, it is determined whether a position designated by the user in the display surface of the display unit 161 has been detected. The designated position is detected in the case where the touch panel 165 outputs the position information. If the designated position is detected, the process proceeds to the step S19. If not, the process proceeds to the step S20. In the step S19, the second CPU 201 controls the communication unit 205 and transmits the position information output by the touch panel 165 to the image processing unit 110.

In the step S20, it is determined whether the press of any of the plurality of hard keys included in the hard key unit 167 has been detected. If the press of the hard key has been detected, the process proceeds to the step S21. If not, the process proceeds to the step S22. In the step S21, the second CPU 201 controls the communication unit 205, and transmits the key identification information for identifying the pressed hard key to the image processing unit 110, and the process proceeds to the step S22. In the step S22, the first screen receiving process is executed similarly to the step S12, and the process returns to the step S15.

Figure 10:
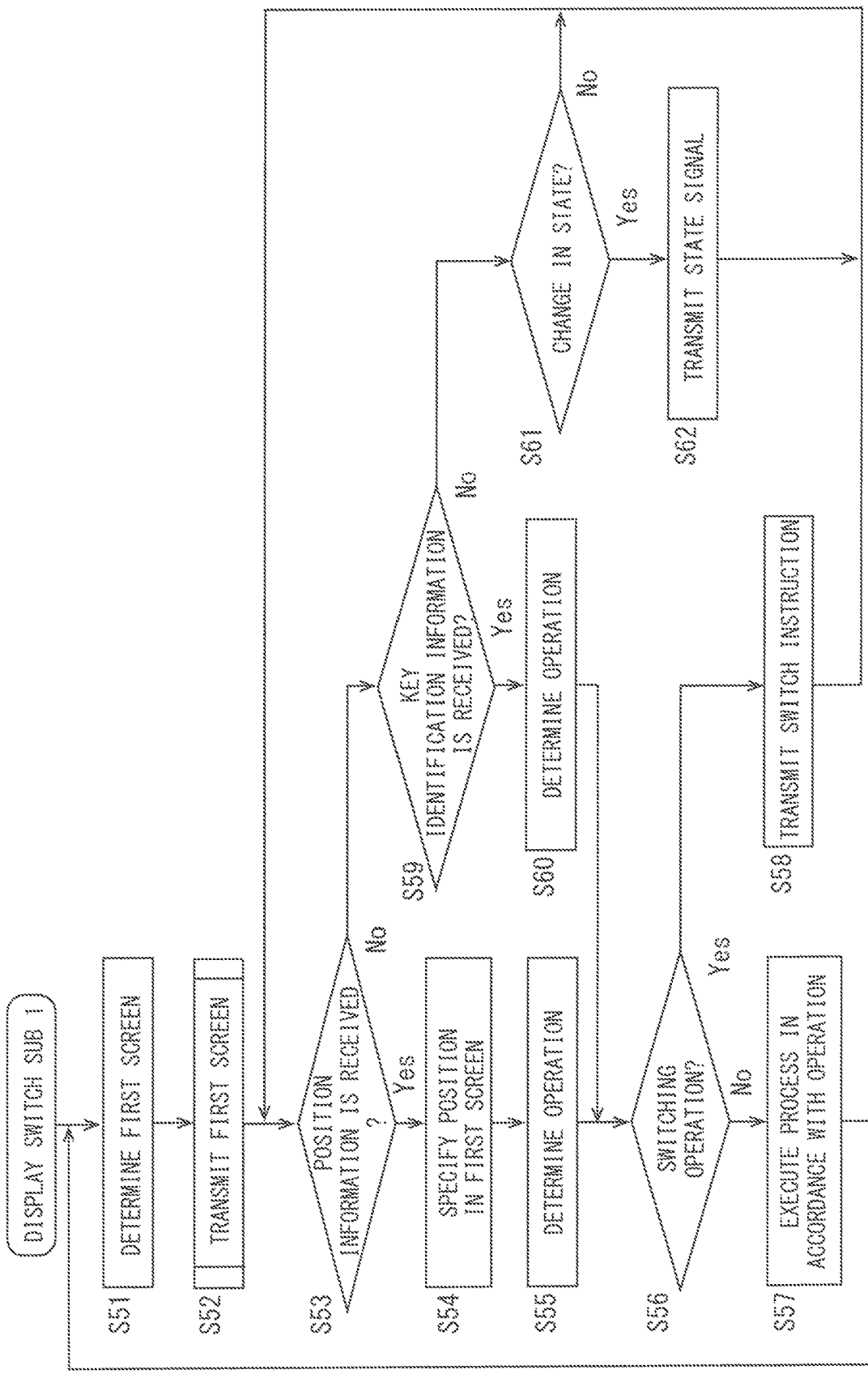
FIG. 10 is a flow chart showing one example of a flow of a display switching sub-process.

FIG. 10 is a flow chart showing one example of a flow of a display switching sub-process. The display switching sub-process is a process executed by the first CPU 111 in the case where the first CPU 111 included in the MFP 100 executes a display switching sub-program stored in the ROM 113, the HDD 204 or the CD-ROM 207. The display switching sub-program is part of the display switching program.

Referring to FIG. 10, the first CPU 111 determines the first screen. The first CPU 111 selects one operation screen for the first screen from among the plurality of operation screens. Then, the first CPU in executes a first screen transmission process (step S52), and the process proceeds to the step S53. While the details of the first screen transmission process will be described below, the first screen transmission process is a process of transmitting one screen to the server unit 200.

In the step S53, the first CPU 111 determines whether the communication I/F unit 112 has received the position information from the server unit 200. If the position information has been received, the process proceeds to the step S54. If not, the process proceeds to the step S59. In the step S54, the first CPU 111 specifies the position in the first screen determined in the step S51 based on the position information, and the process proceeds to the step S55. In the step S55, the operation is determined based on the position specified in the first screen, and the process proceeds to the step S56. The first CPU 111 determines the operation assigned to the button arranged at the position specified in the first screen.

In the step S59, it is determined whether the communication I/F unit 112 has received the key identification information from the server unit 200. If the key identification information has been received, the process proceeds to the step S60. If not, the process proceeds to the step S61. In the step S60, the first CPU 111 determines an operation assigned to the hard key specified by the key identification information, and the process proceeds to the step S56.

In the step S56, it is determined whether the operation determined in the step S55 or the step S60 is a switching operation of switching the display mode to the proxy mode. If it is the switching operation, the process proceeds to the step S58. If not, the process proceeds to the step S57. In the step S57, the first CPU 111 executes the process in accordance with an operation, and the process returns to the step S51. In the step S58, the first CPU 111 controls the communication I/F unit 112 and transmits a switching instruction to the server unit 200, and the process returns to the step S53. Thus, the display mode is switched to the single mode in the second CPU 201, and the second screen determined in the second CPU 201 is displayed in the display unit 161. Therefore, the state of the MFP can be changed such that the user can operate the operation unit 163, input an operation for the server unit 200, and allows the server unit 200 to execute a process.

In the step S61, the first CPU 111 determines whether there has been a change in state of the hardware resources. If there has been a change in state, the process proceeds to the step S62. If not, the process returns to the step S53. In the case where a problem with the hardware resources is detected, the first CPU 111 determines that there has been a change in state. The problems with the hardware resources are a paper jam of a document in a transport path in the automatic document feeder 120, a paper jam of a sheet of paper in a transport path in the image forming unit 140 or the paper feed unit 150, a shortage of sheets of paper stored in the paper feed unit 150 during the image formation in the image forming unit 140, failed completion of the transmission and reception of facsimile data by the facsimile unit 116, and failed completion of the transmission and reception of data by the communication I/F, for example.

Further, in the case where an event in which one or more consumables of the hardware resources reach their predetermined operable life spans is detected, a change in state is detected. As for the consumables of the hardware resources, the consumables in the image forming unit 140 includes a tonner, a photoreceptor drum, a development roller and a fixing roller, for example. Further, in the case where a predetermined operation for the hardware resource by the user is detected, the first CPU 111 detects a change in state. The predetermined operations for the hardware resources by the user include an operation of placing a document in the automatic document feeder 120, an operation of opening the automatic document feeder 120, an operation of opening the front cover that covers the image forming unit 140 and an operation of opening the side cover that covers a path through which a sheet of paper is conveyed, for example.

In the step S62, the first CPU 111 controls the communication I/F unit 112 and transmits a state signal to the server unit 200, and the process returns to the step S53. Thus, the display mode is switched to the proxy mode in the second CPU 201, and the first screen determined in the step S51 is displayed in the display unit 161. Therefore, the first screen, which is determined after the change in state of the hardware resources, is displayed, so that the user can perform an operation corresponding to the change in state of the hardware resources. For example, the user can check the problem with the hardware resources, can check the consumables to be replaced, and can input a setting value for execution of the process, in the first screen.

Figure 11:
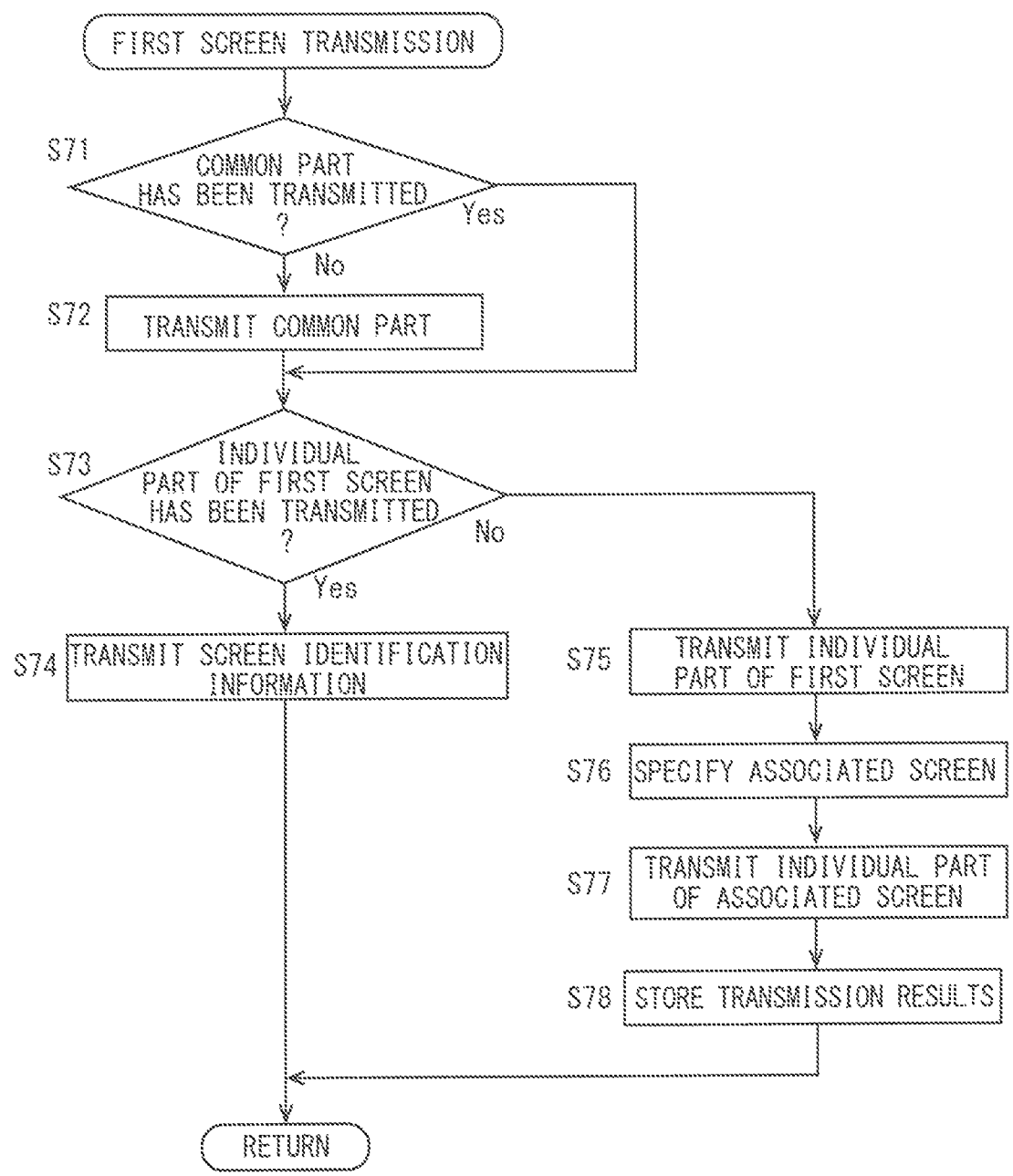
FIG. 11 is a flow chart showing one example of a flow of a first screen transmission process.

FIG. 11 is a flow chart showing one example of a flow of the first screen transmission process. The first screen transmission process is a process executed in the step S52 of FIG. 10. The first screen is determined in a stage before the execution of the first screen transmission process. Referring to FIG. 11, the first CPU 111 determines whether a common part that is common to the plurality of operation screens has already been transmitted to the server unit 200 (step S71). If the next step S72 is performed, and the common part is transmitted, it is determined that the common part has been transmitted. If the common part has been transmitted, the step S72 is skipped, and the process proceeds to the step S73. If the common part has not been transmitted, the process proceeds to the step S72. In the step S72, the first CPU 111 controls the communication I/F unit 112, and transmits the common part to the server unit 200, and the process proceeds to the step S73.

In the step S73, it is determined whether an individual part of the first screen has been transmitted. If the step S77, described below, has been performed, and the individual part of the first screen has been transmitted as the individual part of the associated screen, it is determined that the individual part has been transmitted. The first CPU 111 determines whether the individual part has been transmitted with reference to the transmission results stored in the RAM 114 in the step S78. If the individual part has been transmitted, the process proceeds to the step S74. If the individual part has not been transmitted, the process proceeds to the step S76.

In the step S74, the first CPU 111 controls the communication I/F unit 112, and transmits the screen identification information of the first screen to the server unit 200, and the process returns to the display switching sub-process. Because the screen identification information having a data amount smaller than a data amount of the individual part of the first screen is transmitted, the transmission time period can be reduced, and a response time period required for the second CPU 201 to display the first screen can be reduced.

In the step S75, the first CPU 111 controls the communication I/F unit 112 and transmits the individual part of the first screen to the server unit 200, and the process proceeds to the step S76. In the step S76, the first CPU 111 specifies an associated screen of the first screen. An operation screen, which belongs to a layer lower than a layer to which the first screen belongs and is associated with the first screen, among the plurality of operation screen, is specified as the associated screen. Then, the first CPU 111 controls the communication I/F unit 112, and transmits the individual part of the associated screen to the server unit 200, and the process proceeds to the step S78. In the step S78, the transmission results are stored in the RAM 114, and the process returns to the display switching sub-process. The transmission results include the screen identification information of the associated screen.

FIG. 12 is a flow chart showing one example of a flow of the first screen receiving process. The first screen receiving process is a process executed in the step S12 or the step S22 of FIG. 9. Referring to FIG. 12, the second CPU 201 controls the communication unit 205 and determines whether the common part has been received from the image processing unit 110 (step S31). If the common part has been received, the process proceeds to the step S32. If not, the step S32 is skipped, and the process proceeds to the step S33. In the step S32, the common part is stored in the RAM 203, and the process proceeds to the step S33.

In the step S33, the second CPU 201 controls the communication unit 205, and determines whether the individual part of the first screen has been received from the image processing unit 110. If the individual part of the first screen has been received, the process proceeds to the step S36. If not, the process proceeds to the step S34.

In the step S36, the second CPU 201 generates the first screen, and the process proceeds to the step S37. The second CPU 201 generates the first screen by combining the common part stored in the RAM 203 in the step S32 with the individual part of the first screen received in the step S33. In the next step S37, the second CPU 201 controls the communication unit 205, and determines whether the individual part of the associated screen has been received. If the individual part of the associated screen has been received, the process proceeds to the step S38. If not, the process returns to the display switching main process. In the step S38, the individual part of the associated screen is stored in the RAM 203, and the process returns to the display switching main process.

On the other hand, in the step S34, the second CPU 201 controls the communication unit 205, and determines whether the screen identification information has been received from the image processing unit 110. If the screen identification information has been received, the process proceeds to the step S35. If not, the process returns to the display switching main process. In the step S35, the second CPU 201 extracts an individual part of the associated screen specified by the screen identification information from the individual parts of the associated screens stored in the RAM 203 in the step S38, and the process proceeds to the step S36. In the step S36, in the case where the process proceeds from the step S35, the second CPU 201 generates the first screen by combining the common part stored in the RAM 203 in the step 32 with the individual part of the associated screen extracted in the step S35, and the process proceeds to the step S37.

FIRST MODIFIED EXAMPLE

The second screen determined by the second screen determining portion 263 sometimes includes a process selection button to which an operation of selecting a process executable by the image processing unit 110 is assigned as the proxy mode switching button. For example, the menu screen for selection of a process sometimes includes the process selection button for selecting a process to be executed by the server unit 200, and the process selection button (the single mode switching button) for selecting a process to be executed by the image processing unit 110. In this case, the second screen determining portion 263 outputs the second screen to the display control portion 253 and the second operation determining portion 265.

In the case where the position specified by the position information received from the acceptance control portion 255 is within the process selection button for selecting the process executed by the image processing unit 110, the second operation determining portion 265 determines that the accepted operation is an operation of giving an instruction to switch the display mode to the proxy mode, and outputs a switching instruction to the mode switching portion 251. In this case, it is preferable that the second CPU 201 controls the communication unit 205, and transmits the process identification information for identifying the process selected by the operation assigned to the process selection button to the image processing unit 110. In response, the second CPU 201 can determine that an operation screen for setting a setting value required for execution of the process, specified by the process identification information, by the image processing unit 110 is the first screen.

Figure 13:
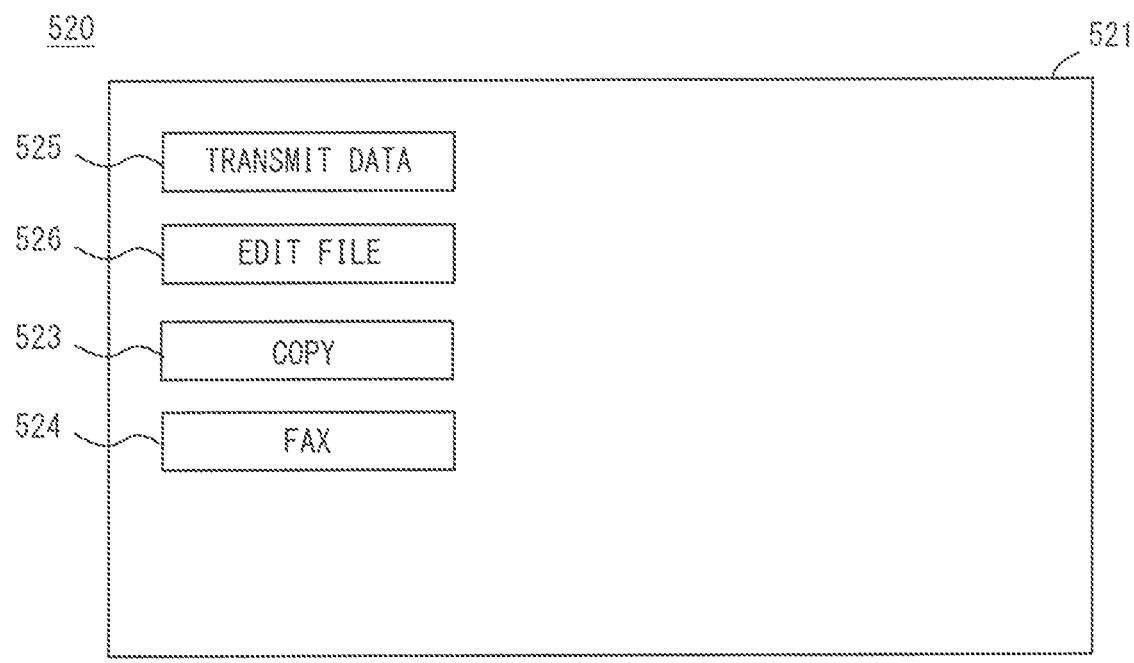
FIG. 13 is a second diagram showing one example of a second screen.

FIG. 13 is a second diagram showing one example of the second screen. Referring to FIG. 13, the second screen 520 is a menu screen for selection of a process, and includes process selection buttons 525, 526 to which operations of selecting processes executable by the server unit 200 are assigned, and the process selection buttons 523, 524 to which operations of selecting processes executable by the image processing unit 110 are assigned. An operation of selecting a copy process is assigned to the process selection button 523. When the process selection button 523 is designated by the user, an operation screen, which is defined as a default operation screen for the copy process, is selected in the image processing unit 110 and displayed in the display unit 161. An operation of selecting the facsimile transmission process is assigned to the process selection button 524. When the process selection button 524 is designated by the user, an operation screen defined as a default operation screen for the facsimile transmission process is selected in the image processing unit 110 and displayed in the display unit 161.

Further, the first screen determined by the first screen determining portion 51 sometimes includes the process selection button to which the operation of selecting a process executable by the server unit 200 is assigned as the proxy mode switching button. For example, the menu screen for selecting a process sometimes includes a process selection button (the proxy mode switching button) for selecting a process to be executed by the server unit 200, and a process selection button for selecting a process to be executed by the image processing unit 110. In this case, the first screen determining portion 51 outputs the first screen to the first screen transmission portion 53 and the first operation determining portion 55.

In response to reception of the position information from the operation receiving portion 57, in the case where the position in the first screen specified by the position information is the process selection button for selecting a process to be executed by the server unit 200, the first operation determining portion 55 determines that the accepted operation is the operation of giving an instruction to switch the display mode to the single mode, and outputs a transmission instruction to the switching instruction transmission portion 61. In response to reception of the transmission instruction from the first operation determining portion 55, the switching instruction transmission portion 61 controls the communication I/F unit 112, and transmits the switching instruction to the server unit 200. In this case, it is preferable that the switching instruction transmission portion 61 controls the communication I/F unit 112, and transmits the process identification information for identifying the process selected by the operation assigned to the process selection button to the server unit 200. In response, the server unit 200 can determine that the operation screen for setting a setting value required for execution of the process specified by the process identification information is the first screen.

Further, in the MFP 100 in the first modified example, in the case where a first transition button included in the first screen is a button for selecting the first process executable by the first CPU 111, and a second transition button is a button for selecting a second process executable by the second CPU 201, the user can operate the MFP 100 without discriminating between the two first CPU 111 and second CPU 201.

SECOND MODIFIED EXAMPLE

In the case where transmitting the first screen to the server unit 200 from the image processing unit 110, the above-mentioned MFP 100 allows the image processing unit 110 to transmit the common part first, and then transmits an individual part in a stage where the first screen is determined. In the second modified example, the first screen transmission portion 53 transmits a difference of the first screen from the first screen that has been transmitted earlier. When receiving the difference, the first screen receiving portion 261 generates a new first screen by changing the first screen that has been received earlier using the difference, and outputs the new first screen to the display control portion 253. In comparison to the case where the entire first screen is transmitted, a data amount to be transmitted and received can be reduced.

THIRD MODIFIED EXAMPLE

Figure 14:
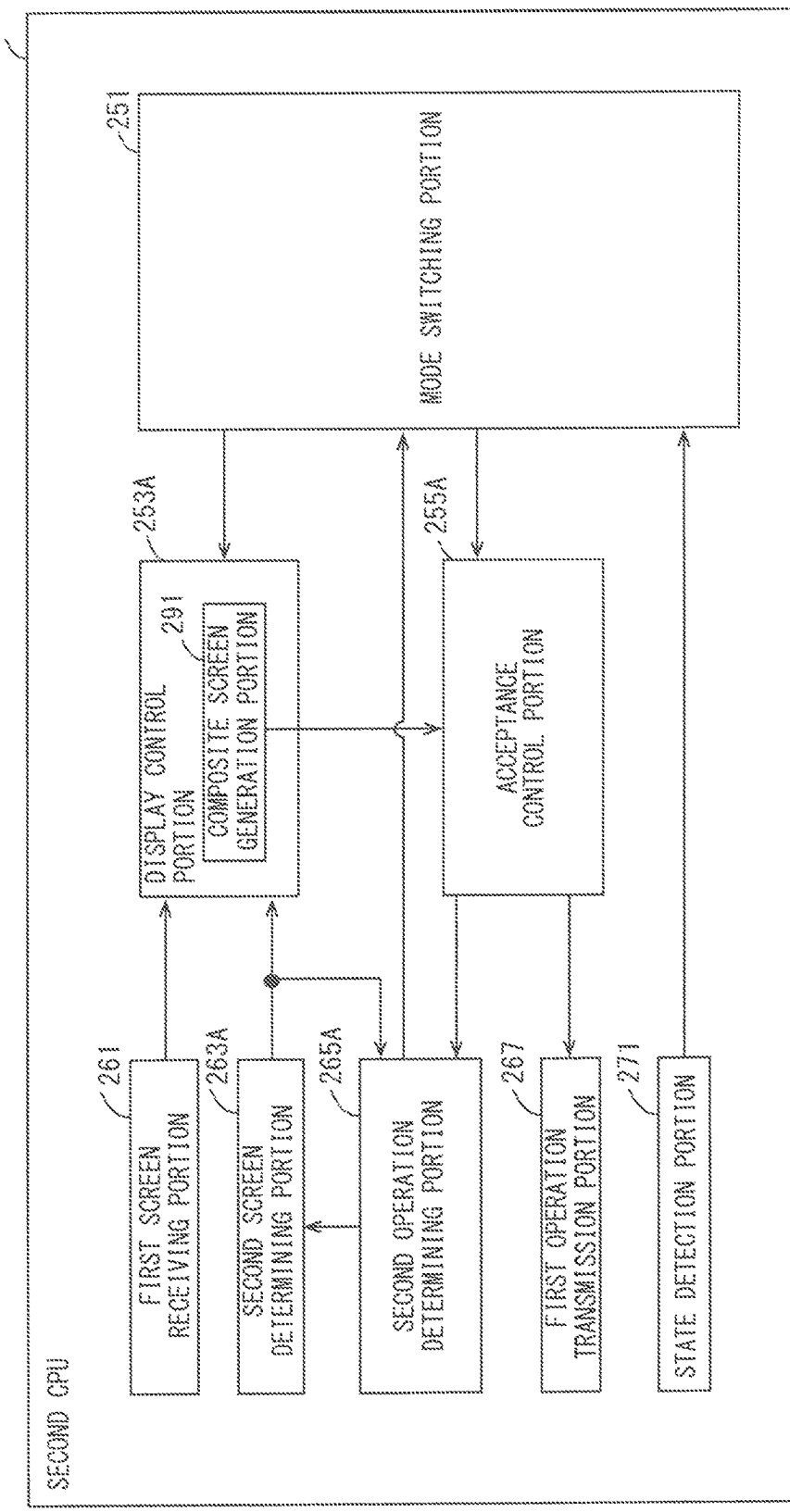
FIG. 14 is a diagram showing one example of functions of a second CPU included in an MFP in a third modified example.

FIG. 14 is a diagram showing one example of functions of a second CPU included in an MFP in the third modified example. Referring to FIG. 14, differences from the functions shown in FIG. 3 are that the display control portion 253, the acceptance control portion 255, the second screen determining portion 263 and the second operation determining portion 265 are respectively changed to a display control portion 253A, an acceptance control portion 255A, a second screen determining portion 263A and a second operation determining portion 265A. Other functions are the same as the functions shown in FIG. 3. Therefore, a description thereof will not be repeated.

In the case where the display mode is the proxy mode, the second screen determining portion 263A selects a second screen, including the single mode switching button to which an operation of switching the display mode to the single mode is assigned. The second screen including only the single mode switching button includes the single mode switching button, and a region other than the single mode switching button in the second screen does not include an image in which "0" is set, for example.

In the case where the display mode received from the mode switching portion 251 is the single mode, the display control portion 253A allows the display unit 161 to display the second screen. The display control portion 253A includes a composite screen generation portion 291. In the case where the display mode is the proxy mode, the composite screen generation portion 291 generates a composite screen by superimposing the second screen on the first screen, and allows the display unit 161 to display the composite screen, and outputs the composite screen to the acceptance control portion 255A. Therefore, the composite screen includes a portion of the second screen in the first screen. The portion of the second screen is a portion in which the single mode switching button is arranged.

In the case where acquiring the position information output by the touch panel 165 when the display mode is the single mode, the acceptance control portion 255A outputs the position information to the second operation determining portion 265. In the case where acquiring the position information output by the touch panel 165 when the display mode is the proxy mode, if the position specified by the position information is within the second screen, the acceptance control portion 255A outputs the position information to the second operation determining portion 265A. In the case where acquiring the position information output by the touch panel 165 when the display mode is the proxy mode, if the position specified by the position information is outside of the second screen, the acceptance control portion 255A outputs the position information to the first operation transmission portion 267.

In the case where acquiring the key identification information output by the hard key unit 167, if the display mode is the single mode, the acceptance control portion 255A outputs the key identification information to the second operation determining portion 265. If the display mode is the proxy mode, the acceptance control portion 255A outputs the key identification information to the first operation transmission portion 267.

The second operation determining portion 265A receives the second screen from the second screen determining portion 263, and receives the position information or the key identification information from the acceptance control portion 255. In response to reception of the position information from the acceptance control portion 255, the second operation determining portion 265A determines an operation based on a position in the second screen specified by the position information. In response to reception of the key identification information from the acceptance control portion 255, the second operation determining portion 265A determines an operation assigned to the key specified by the key identification information.

In the case where the display mode is the single mode, the second screen sometimes includes the proxy mode switching button to which an operation of giving an instruction to switch the display mode to the proxy mode is assigned. In the case where a position specified by the position information received from the acceptance control portion 255 is within the proxy mode switching button, the second operation determining portion 265A determines that the accepted operation is an operation of giving an instruction to switch the display mode to the proxy mode, and outputs a proxy mode switching instruction of giving an instruction to switch the display mode to the proxy mode to the mode switching portion 251.

In the case where the display mode is the proxy mode, the second screen includes the single mode switching button at a position specified by the position information. In the case where the position specified by the position information received from the acceptance control portion 255 is within the single mode switching button, the second operation determining portion 265A determines that the accepted operation is an operation of giving an instruction to switch the display mode to the single mode, and outputs a single mode switching instruction of giving an instruction to switch the display mode to the single mode to the mode switching portion 251.

In response to reception of the single mode switching instruction from the second operation determining portion 265A when the display mode is being switched to the proxy mode, the mode switching portion 251 switches the display mode to the single mode. In response to reception of the proxy mode switching instruction from the second operation determining portion 265A when the display mode is being switched to the single mode, the mode switching portion 251 switches the display mode to the proxy mode.

Figure 15:
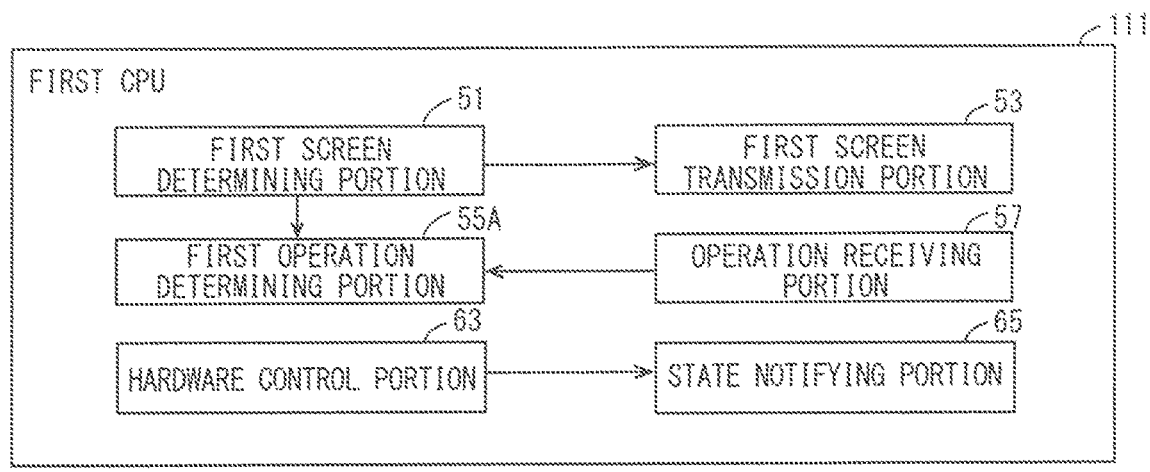
FIG. 15 is a diagram showing one example of functions of a first CPU included in the MFP in the third modified example.

FIG. 15 is a diagram showing one example of functions of the first CPU included in the MFP in the third modified example. Differences of the functions shown in Fig.15 from the functions shown in FIG. 4 are that the first operation determining portion 55 is changed to a first operation determining portion 55A, and that the switching instruction transmission portion 61 is removed. The other functions are the same as the functions shown in FIG. 4. A description thereof will not be repeated. The first operation determining portion 55A receives a first screen from the first screen determining portion 51, and receives the position information or the key identification information from the operation receiving portion 57. In response to reception of the position information from the operation receiving portion 57, the first operation determining portion 55A determines an operation based on the position in the first screen specified by the position information. In response to reception of the key identification information from the operation receiving portion 57, the first operation determining portion 55A determines an operation assigned to the key specified by the key identification information.

It is not necessary that the first screen in the third modified example includes the single mode switching button to which the operation of giving an instruction to switch the display mode to the single mode is assigned. Therefore, a load on the image processing unit 110 can be small.

Figure 16:
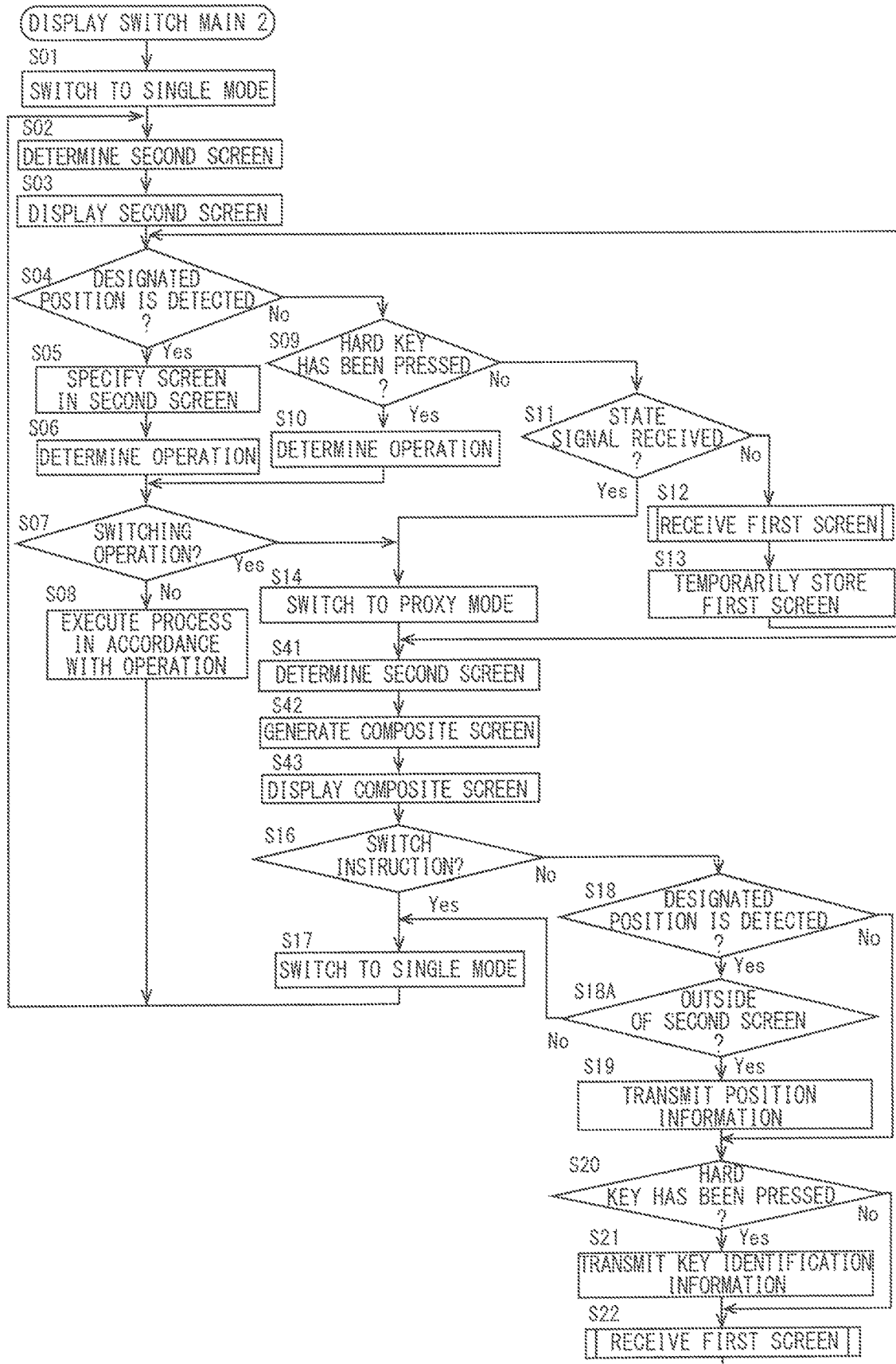
FIG. 16 is a flow chart showing a flow of a display switching main process in the third modified example.

FIG. 16 is a flow chart showing one example of a flow of a display switching main process in the third modified example. Referring to FIG. 16, differences from the display switching main process shown in FIG. 9 are that the steps S41 to S42 are performed instead of the step S15, and the step S18A is added between the step S18 and S19. The rest of the process is the same as the process shown in FIG. 9. Therefore, a description thereof will not be repeated.

After the display mode is switched to the proxy mode in the step S14, the second screen is determined in the step S41, and the process proceeds to the step S42. The determined second screen includes only the single mode switching button to which an operation of switching the display mode to the single mode is assigned. In the step S42, a composite screen is generated. The second screen determined in the step S41 is superimposed on the first screen temporarily stored in the RAM 203 in the step S13, so that the composite screen is generated. Then, the composite screen is displayed in the display unit 161 (step S43), and the process proceeds to the step S16. Specifically, the composite screen is stored in the video RAM to which the display unit 161 makes reference.

When a position designated by the user in the display surface of the display unit 161 is detected in the step S18, the process proceeds to the step S18A. In the step S18A, whether the detected position is outside of the second screen is determined. In the case where the position outside of the second screen is detected, the process proceeds to the step S19. If not, the process proceeds to the step S17.

Figure 17:
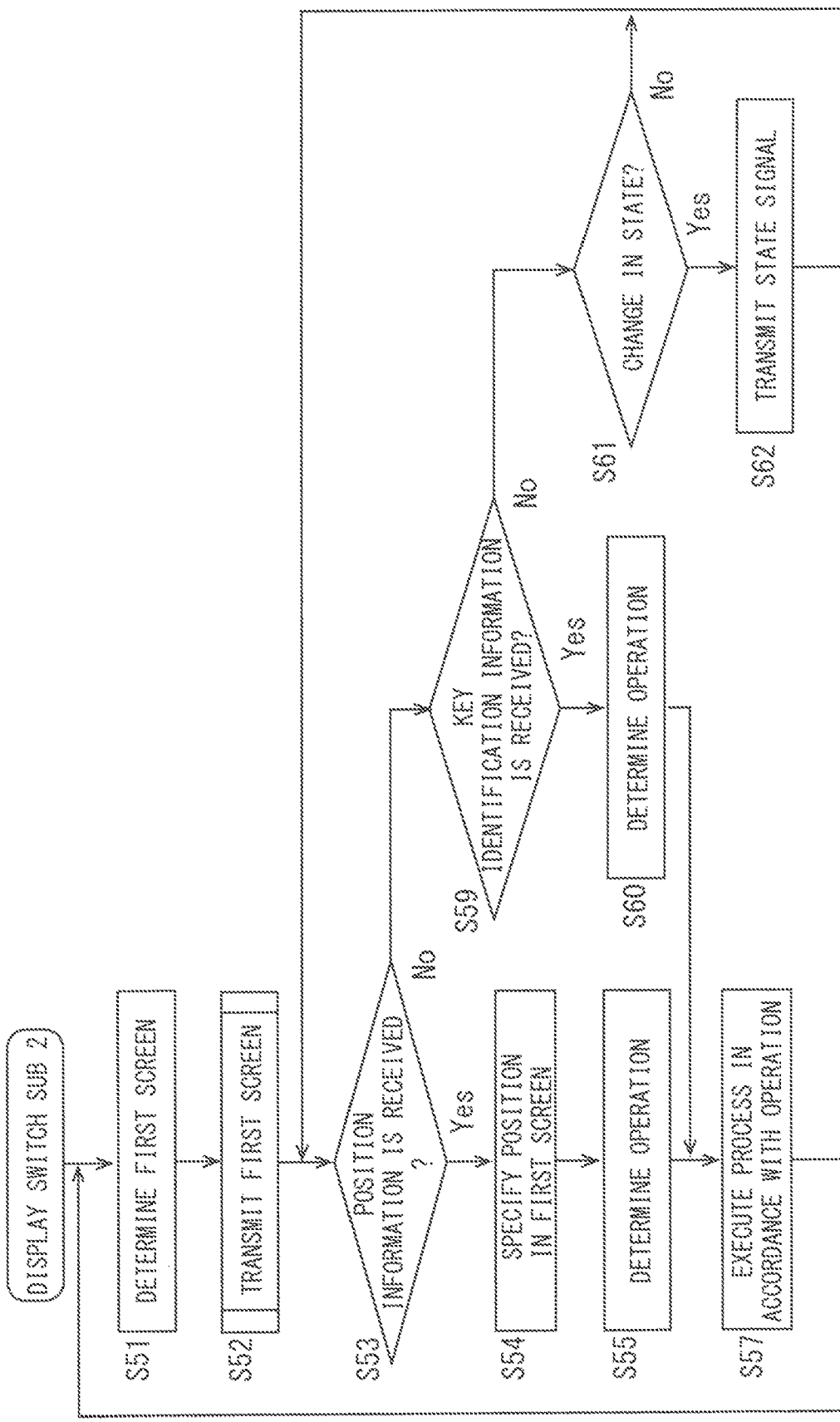
FIG. 17 is a flow chart showing one example of a flow of a display switching sub-process in the third modified example.

FIG. 17 is a flow chart showing one example of a flow of a display switching sub-process in the third modified example. Referring to FIG. 17, differences from the display switching sub-process shown in FIG. 10 are that the step S56 and S58 are removed. The rest of the process is the same as the process shown in FIG. 10. Therefore, a description thereof will not be repeated.

When the first CPU 111 determines an operation in the step S55 or S60, the process proceeds to the step S57. In the step S57, the first CPU 111 executes the process in accordance with the operation determined in the step S55 or the step S60, and the process returns to the step S51.

In the case where the display mode is the proxy mode, the MFP 100 in the third modified example displays an image, of the composite screen in which the first screen and the second screen including the single mode switching button (the second transition button) for switching the display mode to the single mode are combined, in the display unit 161. In the case where an operation of designating a position in the first screen of the composite screen is accepted, a first operation is determined. In the case where an operation of designating a position in the second screen of the composite screen is accepted, a second operation of switching the display mode to the single mode is determined. Therefore, the display modes are switched only by the second CPU 201, so that a load on the first CPU 111 is not increased.

FOURTH MODIFIED EXAMPLE

In the fourth modified example, the hard key unit 167 includes a proxy mode switching key to which an operation of giving an instruction to switch the display mode to the proxy mode is assigned, and a single mode switching key to which an operation of giving an instruction to switch the display mode to the single mode is assigned. In addition to the above-mentioned functions, the acceptance control portion 255 has two following functions. When detecting the press of the proxy mode switching key with the display mode being the single mode, the acceptance control portion 255 does not output the key identification information to the second operation determining portion 265, but outputs a proxy mode switching instruction to the mode switching portion 251. Further, in the case where detecting the press of the single mode switching key with the display mode being the proxy mode, the acceptance control portion 255 does not output the key identification information to the first operation transmission portion 267, and outputs the single mode switching instruction to the mode switching portion 251. The single mode switching key and the proxy mode switching key may be the same hard key.

In response to reception of the single mode switching instruction from the acceptance control portion 255, the mode switching portion 251 switches the display mode to the single mode. In response to reception of the proxy mode switching instruction from the acceptance control portion 255, the mode switching portion 251 switches the display mode to the proxy mode.

As described above, the MFP 100 in the present embodiment functions as a multiple function apparatus that includes the first CPU 111 having the image processing function, the second CPU 201 having the server function and the operation panel 160. In the case where the display mode is the proxy mode, the second CPU 201 allows the display unit 161 to display the image of the first screen determined by the first CPU 111. In the case where the display mode is the single mode, the second CPU 201 allows the display unit 161 to display the image of the second screen determined by the second CPU 201. Therefore, the second CPU 201 allows the display unit 161 to display any one of the first screen and the second screen, the screens can be smoothly switched.

Further, in the case where the display mode is the single mode, the second CPU 201 determines the second operation in accordance with the operation accepted by the operation unit 163. In the case where the display mode is the proxy mode, the second CPU 201 allows the first CPU 111 to determine the first operation in accordance with the operation accepted by the operation unit 163. Therefore, an operation for each of the first CPU 111 and the second CPU 201 can be accepted in the one operation unit 163.

Further, the second CPU 201 switches the display modes based on the operation accepted by the operation unit 163. Therefore, the user can select one of the first CPU 111 and the second CPU 201, and inputs an operation.

Further, the second screen displayed during the single mode includes the first transition button, and the first screen displayed during the proxy mode includes the second transition button. Therefore, the user can switch display modes by an operation of switching the screens displayed in the display unit 161.

Further, after transmitting the common part, the first CPU 111 transmits the individual part corresponding to the first screen to the second CPU 201. In response to reception of the individual part of the first screen from the first CPU 111, the second CPU 201 displays the composite image in which the individual part of the first screen is combined with the common part as the first screen. Therefore, it is not necessary to transmit the entire first screen, so that a data amount transmitted from the first CPU 111 to the second CPU 201 can be reduced.

Further, in the case where not having transmitted the first screen, the first CPU 111 transmits the first screen to the second CPU 201 together with the associated screens associated with the first screen. In the case where having already transmitted the first screen, the first CPU 111 transmits the screen identification information for identifying the first screen to the second CPU 201. In response to reception of the first screen and the associated screens from the first CPU 111, the second CPU 201 displays the first screen and temporarily stores the associated screens. In the case where receiving the screen identification information, the second CPU 201 displays the screen specified by the screen identification information among the temporarily stored associated screens as the first screen. Therefore, in the case where the screen identification information is transmitted and received instead of the first screen, a data amount to be transmitted and received is reduced. Thus, a response time period required for the first screen to be displayed can be reduced.

Further, in response to detection of a predetermined state of the hardware resource included in the MFP 100, the second CPU 201 switches the display mode to the proxy mode. Therefore, the first screen corresponding to the predetermined state of the hardware resource can be displayed.

Further, in the case where detecting a problem with the hardware resources included in the MFP 100, the first CPU 111 detects the predetermined state. Therefore, the first CPU 111 can notify the user of the problem with the hardware resources.

Further, in the case where one or more consumables included in the MFP 100 are in the predetermined state, the first CPU 111 detects the predetermined state. Thus, the user can be notified of the states of the one or more consumables.

Further, in the case where detecting an operation by the user, the first CPU 111 detects the predetermined state. Thus, the first CPU 111 can display the first screen corresponding to the operation by the user.

Although embodiments of the present invention have been described and illustrated in detail, it is clearly understood that the same is by way of illustration and example only and not limitation, the scope of the present invention should be interpreted by the terms of the appended claims.

What is claimed is:

1. A multiple function apparatus comprising:
   an image processing apparatus, in which a first hardware processor is provided;
   a server, in which a second hardware processor different from the first hardware processor is provided; and
   a display commonly used by the first hardware processor and the second hardware processor, the display being communicatively coupled to the server,
   wherein:
   the first hardware processor selects a first screen from among a plurality of predetermined stored operation screens, and
   the second hardware processor:
   determines a second screen,
   switches a display mode to one of a single mode and a proxy mode,
   in a case where the display mode is the proxy mode, receives the first screen selected by the first hardware processor from the first hardware processor and controls the display to display an image of the received first screen, and
   in a case where the display mode is the single mode, controls the display to display an image of the determined second screen.

2. The multiple function apparatus according to claim 1, further comprising an operation panel that is commonly used by the first hardware processor and the second hardware processor and accepts an operation by a user,
   wherein:
   the first hardware processor further determines a first operation corresponding to the first screen, and
   the second hardware processor further:
   controls the operation panel, and
   controls the first hardware processor to determine the first operation in accordance with an operation accepted by the operation panel in the case where the display mode is the proxy mode, and determines a second operation corresponding to the determined second screen in accordance with an operation accepted by the operation panel in the case where the display mode is the single mode.

3. The multiple function apparatus according to claim 2, wherein the second hardware processor switches the display mode based on an operation accepted by the operation panel.

4. The multiple function apparatus according to claim 3, wherein:
   the second hardware processor, in response to acceptance of an operation of designating a first transition button included in the second screen for switching the display mode to the proxy mode, determines that the accepted operation is an operation of giving an instruction to switch the display mode to the proxy mode,
   the first hardware processor, in response to acceptance of an operation of designating a second transition button included in the first screen for switching the display mode to the single mode, determines that the accepted operation is an operation of giving an instruction to switch the display mode to the single mode, and
   the second hardware processor, in response to a determination that the accepted operation is the operation of giving an instruction to switch the display mode to the proxy mode, switches the display mode to the proxy mode, and in response to a determination that the accepted operation is the operation of giving an instruction to switch the display mode to the single mode, switches the display mode to the single mode.

5. The multiple function apparatus according to claim 4, wherein:
   the second transition button is a button for selecting a first process to be executed by the first hardware processor, and
   the first transition button is a button for selecting a second process to be executed by the second hardware processor.

6. The multiple function apparatus according to claim 3, wherein the second hardware processor:
   in the case where the display mode is the single mode, determines the second screen including a first transition button for switching the display mode to the proxy mode, and in the case where the display mode is the proxy mode, determines the first screen including a second transition button for switching the display mode to the single mode,
   in the case where the display mode is the proxy mode, controls the display to display an image of a composite screen in which the determined first screen is combined with the determined second screen,
   in the case where the display mode is the proxy mode, in response to a position in the composite screen that is specified by an operation accepted by the operation panel being in the first screen, outputs the operation accepted by the operation panel to the first hardware processor, in a case where a position in the composite screen that is specified by an operation accepted by the operation panel is in the second screen, determines the operation accepted by the operation panel, in response to acceptance of an operation of designating the first transition button, determines that the accepted operation is an operation of giving an instruction to switch the display mode to the proxy mode, and in response to acceptance of an operation of designating the second transition button, determines that the accepted operation is an operation of giving an instruction to switch the display mode to the single mode, and in response to a determination that the accepted operation is the operation of giving an instruction to switch the display mode to the single mode, switches the display mode to the single mode, and in response to a determination that the accepted operation is the operation of giving an instruction to switch the display mode to the proxy mode, switches the display mode to the proxy mode.

7. The multiple function apparatus according to claim 6, wherein:

the second transition button is a button for selecting a first process to be executed by the first hardware processor, and the first transition button is a button for selecting a second process to be executed by the second hardware processor.

8. The multiple function apparatus according to claim 2, wherein:

the first hardware processor:
in response to selection of the first screen, transmits the first screen to the server, and
based on an operation received from the server after the first screen is transmitted to the server, determines an operation corresponding to the first screen, and the second hardware processor:
in the case where the display mode is the proxy mode, controls the display to display the image of the received first screen in response to reception of the first screen from the image processing apparatus, and
in the case where the display mode is the proxy mode, transmits an operation accepted by the operation panel to the image processing apparatus.

9. The multiple function apparatus according to claim 8, wherein:

the plurality of predetermined stored operation screens include common parts common to other screens, and individual parts that differ from individual parts of the other screens, the first hardware processor, after transmitting the common parts, transmits an individual part corresponding to the selected first screen to the server in response to selection of the first screen, and the second hardware processor, in the case where the display mode is the proxy mode, in response to reception of the individual part of the first screen from the image processing apparatus, controls the display to display a composite image in which the individual part of the first screen is combined with the common part received in advance from the image processing apparatus as the first screen.

10. The multiple function apparatus according to claim 8, wherein:

each of the plurality of predetermined stored operation screens is assigned to one of a plurality of layers and is associated with other screens assigned to upper layers or/and lower layers, the first hardware processor, in response to selection of the first screen, (i) in a case where the first screen has not been transmitted, transmits the first screen to the server together with the other screens associated with the first screen, and (ii) in a case where the first screen has already been transmitted, transmits screen identification information for identifying the first screen to the server, and the second hardware processor:
in the case where the display mode is the proxy mode, in response to reception of the first screen and the other screens from the image processing apparatus, controls the display to display the first screen and temporarily stores the other screens, and
in the case where the screen identification information is received from the image processing apparatus, controls the display to display a screen specified by the screen identification information from among the other temporarily stored screens.

11. The multiple function apparatus according to claim 2, wherein the image processing apparatus comprises an image forming device which forms an image on a printing medium based on image data.

12. The multiple function apparatus according to claim 1, wherein the image processing apparatus comprises an image processor that is controlled by the first hardware processor and processes an image, wherein the second hardware processor, in response to detection of a predetermined state of the image processor by the first hardware processor with the display mode being the single mode, switches the display mode to the proxy mode.

13. The multiple function apparatus according to claim 12, wherein the first hardware processor, in a case where a problem with the image processor is detected, detects the predetermined state.

14. The multiple function apparatus according to claim 12, wherein the first hardware processor, in a case where at least one consumable included in the image processor is in a predetermined state, detects the predetermined state.

15. The multiple function apparatus according to claim 12, wherein the first hardware processor, in a case where an operation for the image processor by the user is detected, detects the predetermined state.

16. The multiple function apparatus according to claim 1, wherein the image processing apparatus comprises an image forming device which forms an image on a printing medium based on image data.

17. A display switching method performed in a multiple function apparatus comprising an image processing apparatus in which a first hardware processor is provided, a server in which a second hardware processor different from the first hardware processor is provided, and a display which is commonly used by the first hardware processor and the second hardware processor and which is communicatively coupled to the server, the display switching method comprising:

controlling the first hardware processor to perform a first screen selection step of selecting a first screen from among a plurality of predetermined stored operation screens, and controlling the second hardware processor to perform:

a display control step of controlling the display to display an image, a second screen determining step of determining a second screen, a second operation determining step of determining a second operation corresponding to the determined second screen, and a mode switching step of switching a display mode to one of a single mode and a proxy mode, wherein the display control step includes:

a step of, in a case where the display mode is the proxy mode, receiving the first screen selected in the first screen selection step from the first hardware processor and controlling the display to display an image of the received first screen, and a step of, in a case where the display mode is the single mode, controlling the display to display an image of the second screen determined in the second screen determining step.

18. A non-transitory computer-readable recording medium encoded with a display switching program, the display switching program being executable by a first hardware processor and a second hardware processor included in a multiple function apparatus and controlling the multiple function apparatus, the second hardware processor being different from the first hardware processor, the multiple function apparatus including an image processing apparatus in which the first hardware processor is provided, a server in which the second hardware processor is provided, and a display which is commonly used by the first hardware processor and the second hardware processor and which is communicatively coupled to the server, and the display switching program, when executed, actualizing processes comprising:

controlling the first hardware processor to select a first screen from among a plurality of predetermined stored operation screens, and controlling the second hardware processor to:
control the display to display an image,
determine a second screen,
determine a second operation corresponding to the determined second screen,
switch a display mode to one of a single mode and a proxy mode,
in a case where the display mode is the proxy mode, receive the first screen selected by the first hardware processor from the first hardware processor and control the display to display an image of the received first screen, and
in a case where the display mode is the single mode, control the display to display an image of the determined second screen.

* * * * *